(12) United States Patent
Katsuyama

(10) Patent No.: US 10,362,271 B2
(45) Date of Patent: Jul. 23, 2019

(54) VIDEO-CONFERENCE TABLE AND VIDEO-CONFERENCE SYSTEM

(71) Applicant: Goro Katsuyama, Kanagawa (JP)

(72) Inventor: Goro Katsuyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/026,262

(22) Filed: Jul. 3, 2018

(65) Prior Publication Data

US 2019/0014287 A1    Jan. 10, 2019

(30) Foreign Application Priority Data

Jul. 5, 2017  (JP) ................................ 2017-131891
Jun. 5, 2018  (JP) ................................ 2018-107609

(51) Int. Cl.
| | |
|---|---|
| *H04N 7/14* | (2006.01) |
| *H04N 7/15* | (2006.01) |
| *H04N 1/10* | (2006.01) |
| *H04N 1/42* | (2006.01) |
| *H04N 1/00* | (2006.01) |

(52) U.S. Cl.
CPC ........... *H04N 7/15* (2013.01); *H04N 1/00299* (2013.01); *H04N 1/1065* (2013.01); *H04N 1/42* (2013.01); *H04N 7/142* (2013.01); *H04N 7/144* (2013.01)

(58) Field of Classification Search
CPC ............ H04N 7/15; H04N 7/144; H04N 1/42; H04N 1/1065; H04N 1/00299; H04N 1/00559; H04N 1/04; H04N 2201/0434; H04N 2201/0436
See application file for complete search history.

(56) References Cited

U.S. PATENT DOCUMENTS

| | | | | |
|---|---|---|---|---|
| 5,734,414 A | * | 3/1998 | Nishimura ............. | H04N 7/142 348/14.05 |
| 7,903,171 B2 | * | 3/2011 | Takabatake ........... | G06F 1/1616 348/376 |

(Continued)

FOREIGN PATENT DOCUMENTS

| | | |
|---|---|---|
| JP | 6-078108 | 3/1994 |
| JP | 2007-104339 | 4/2007 |
| JP | 2016-066857 | 4/2016 |

*Primary Examiner* — Stella L. Woo
(74) *Attorney, Agent, or Firm* — Harness, Dickey & Pierce, P.L.C.

(57) ABSTRACT

A video-conference table and a video-conference system. The video-conference table includes an imaging device disposed outside facing space that faces an object to be captured on a holding surface. The imaging device is configured to capture the object to be captured held on the holding surface, in a slanting direction with reference to a normal-line direction of the holding surface. The video-conference table further includes an image processing device configured to perform image processing including correcting image data obtained by capturing of the imaging device to image data obtained when the surface of the object to be captured is captured in a normal-line direction of the holding surface. The video-conference system includes the video-conference table coupled to an attachment having a surface approximately flush with the holding surface in a horizontal direction.

14 Claims, 21 Drawing Sheets

(56) References Cited

U.S. PATENT DOCUMENTS

| | | | | |
|---|---|---|---|---|
| 8,605,174 | B2 * | 12/2013 | Namie | H04N 1/00814 348/14.08 |
| 8,823,962 | B2 * | 9/2014 | Maghakian | B41J 3/44 358/1.13 |
| 2006/0181607 | A1 * | 8/2006 | McNelley | G02B 27/2292 348/14.08 |
| 2007/0076268 | A1 * | 4/2007 | Shojo | H04N 1/00347 358/474 |
| 2007/0081065 | A1 * | 4/2007 | Ootsuka | H04N 1/00795 347/104 |
| 2011/0234746 | A1 * | 9/2011 | Saleh | G06F 3/041 348/14.03 |
| 2012/0001999 | A1 * | 1/2012 | Schirdewahn | H04N 7/142 348/14.01 |
| 2013/0321830 | A1 * | 12/2013 | Jimenez | H04N 1/00535 358/1.13 |
| 2014/0028865 | A1 * | 1/2014 | Ohtaka | H04N 5/23203 348/211.4 |
| 2015/0138609 | A1 * | 5/2015 | Golding | H04N 1/00541 358/447 |

* cited by examiner

VIDEO-CONFERENCE TABLE AND VIDEO-CONFERENCE SYSTEM

CROSS-REFERENCE TO RELATED APPLICATIONS

This patent application is based on and claims priority pursuant to 35 U.S.C. § 119(a) to Japanese Patent Application Nos. 2017-131891 and 2018-107609, filed on Jul. 5, 2017, and Jun. 5, 2018, respectively, in the Japan Patent Office, the entire disclosures of which are hereby incorporated by reference herein.

BACKGROUND

Technical Field

Embodiments of the present invention relate to a video-conference table and a video-conference system.

Background Art

Imaging apparatuses that use an imaging device to capture an object to be captured held on a holding surface are known in the art.

For example, image forming apparatuses each provided with a document reader that captures an upward document are known in the art. Moreover, a document (object to be captured) whose plane to be captured is made upward is placed on the top surface of a document holding cover that opens and closes with reference to a flatbed platen (contact glass/exposure glass), and the plane to be captured of that upward document is captured by an imaging device of the document reader. The imaging device is attached to the tip end of a bearing bar disposed approximately in the center on the far side of the document holding cover, and the tip end of that bearing bar extends toward the front. Accordingly, the imaging device is positioned above the center position of the document.

SUMMARY

Embodiments of the present disclosure described herein provide a video-conference table and a video-conference system. The video-conference table includes an imaging device disposed outside facing space that faces an object to be captured on a holding surface. The imaging device is configured to capture the object to be captured held on the holding surface, in a slanting direction with reference to a normal-line direction of the holding surface. The video-conference system includes the video-conference table coupled to an attachment having a surface approximately flush with the holding surface in a horizontal direction.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
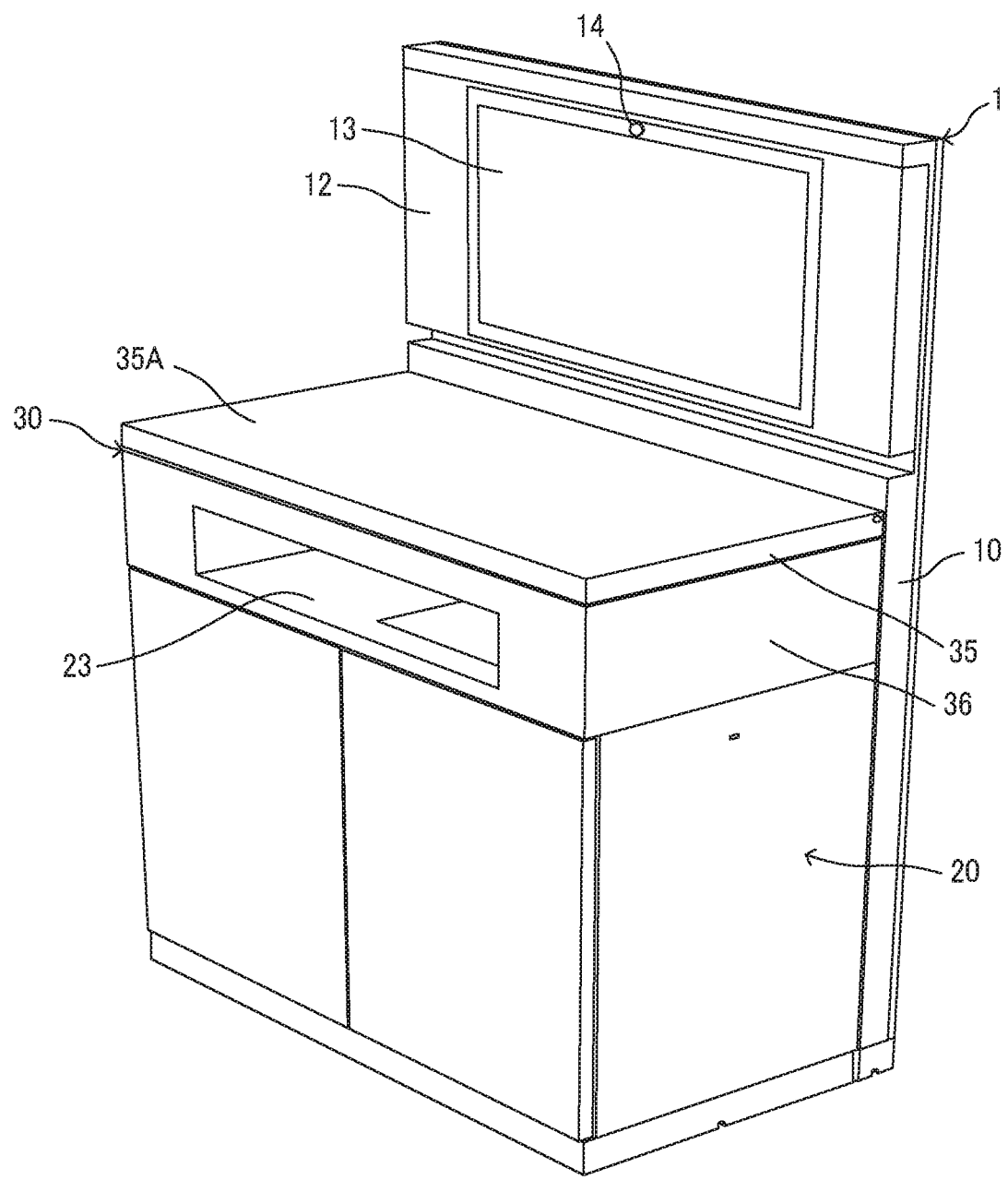
FIG. 1 is a front perspective view of an image forming apparatus according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a". "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, an image forming apparatus according to an embodiment of the present disclosure is used as a table unit of a video-conference table.

FIG. 1 is a front perspective view of an image forming apparatus 1 according to an embodiment of the present disclosure.

Figure 2:
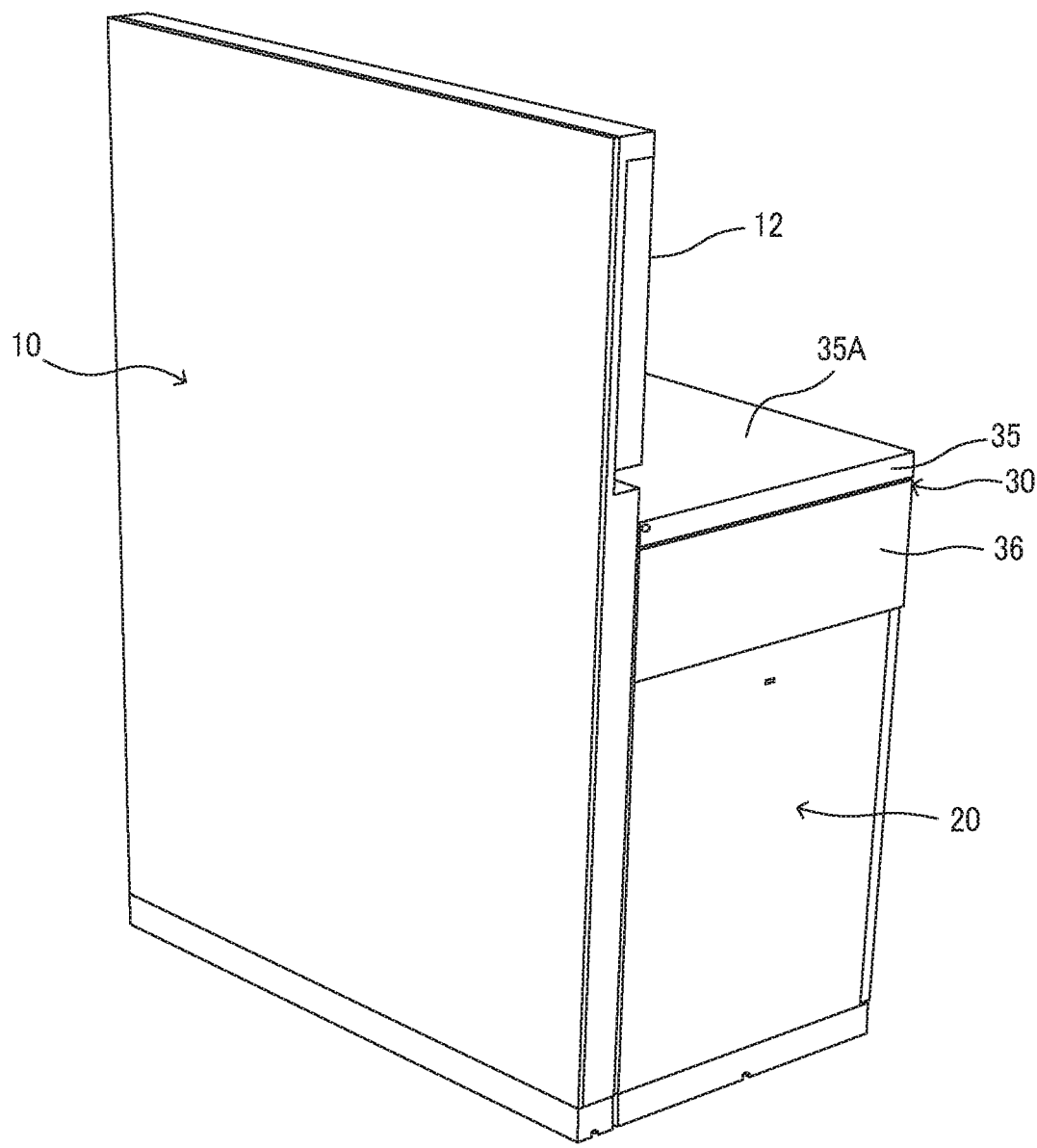
FIG. 2 is a rear perspective view of the image forming apparatus of FIG. 1.

FIG. 2 is a rear perspective view of the image forming apparatus of FIG. 1 according to the present embodiment.

Figure 3:
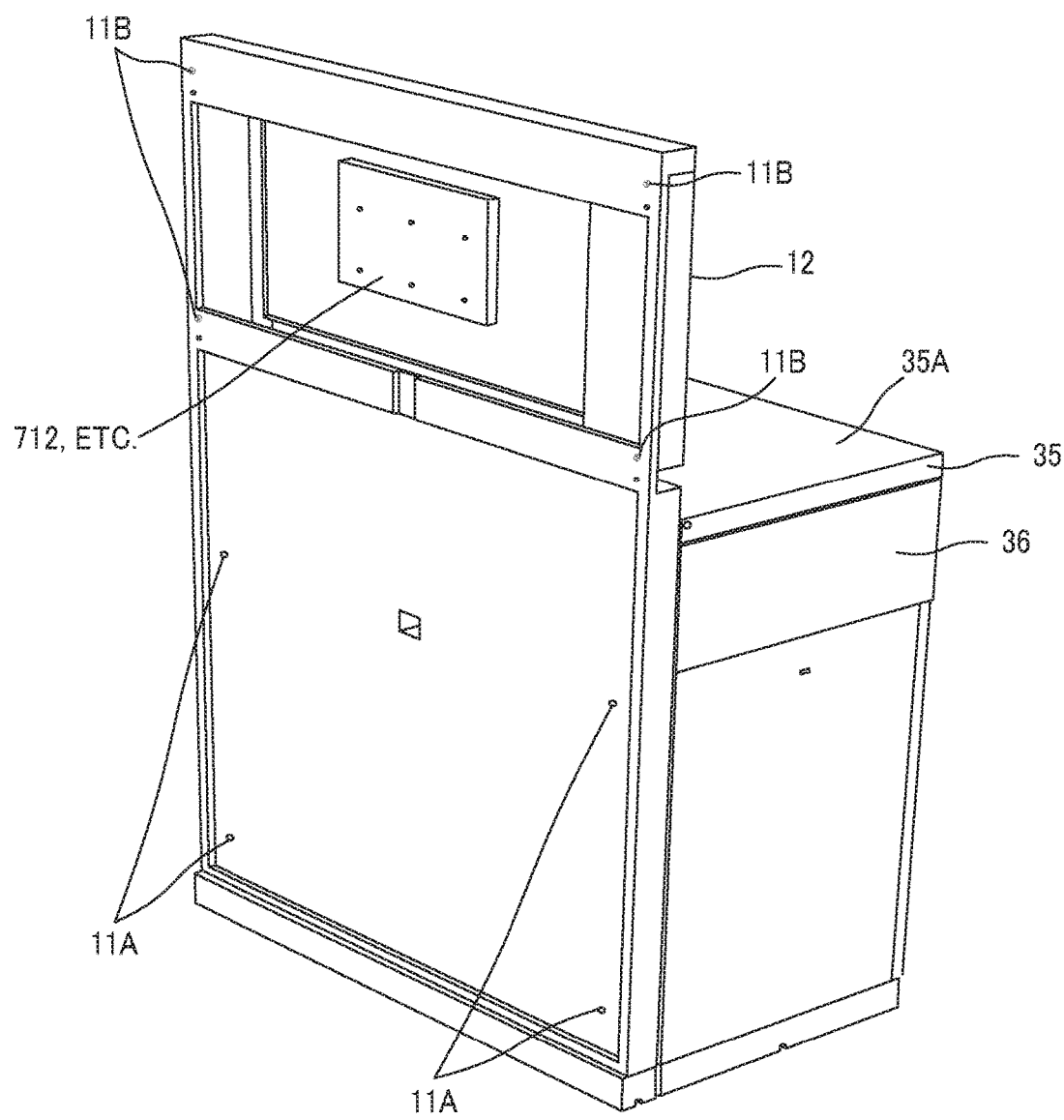
FIG. 3 is a perspective view of the inner structure of the image forming apparatus of FIG. 1 where the rear panel of a panel unit is removed.

FIG. 3 is a perspective view of the inner structure of the image forming apparatus 1 according to the present embodiment, where the rear panel of a panel unit is removed.

The image forming apparatus 1 according to the present embodiment includes the plate-shaped panel unit 10 and the image forming unit 20. Moreover, the image forming unit 20 is mounted in front of the lower part of the panel unit 10, and the upper part of the panel unit 10 extends upward from the rear of the image forming unit 20. As illustrated in FIG. 3, the panel unit 10 is fastened to the image forming unit 20 by the screws at fastening positions 11A, and the panel unit 10 can be detached from the image forming unit 20 by removing these screws.

A display 12 is disposed in front of the upper part of the panel unit 10. The display 12 is fastened to the panel unit 10 by the screws at fastening positions 11B. and the display 12 can be detached from the panel unit 10 by removing these screws. The display 12 is provided with a touch panel 13 that displays an image on the front side of the apparatus. This touch panel 13 may also serve as an operation panel to operate the image forming apparatus 1 according to the present embodiment. One of the vertical length and the horizontal length of the screen of the touch panel 13 is equal to or longer than the longer-side length of the maximum paper size where the image forming unit 20 can form an image, and the other one of the vertical length and the horizontal length the screen of the touch panel 13 is equal to or longer than the shorter-side length of the maximum paper size. At the maximum, the image forming apparatus 1 according to the present embodiment can form an image on sheet P of A Series Size 3 (hereinafter, this size will be referred to as "A3") in Japanese Industrial Standards (JIS). Accordingly, the longer-side length of the maximum paper size where the image forming unit 20 can form an image is 420 millimeters (mm), and the shorter-side length of the maximum paper size is 297 mm. Due to this configuration of the present embodiment, as will be described later in detail, an image in A3 image size (actual size) or a magnified image larger than the image in actual size can be displayed on the screen of the touch panel 13.

Figure 4:
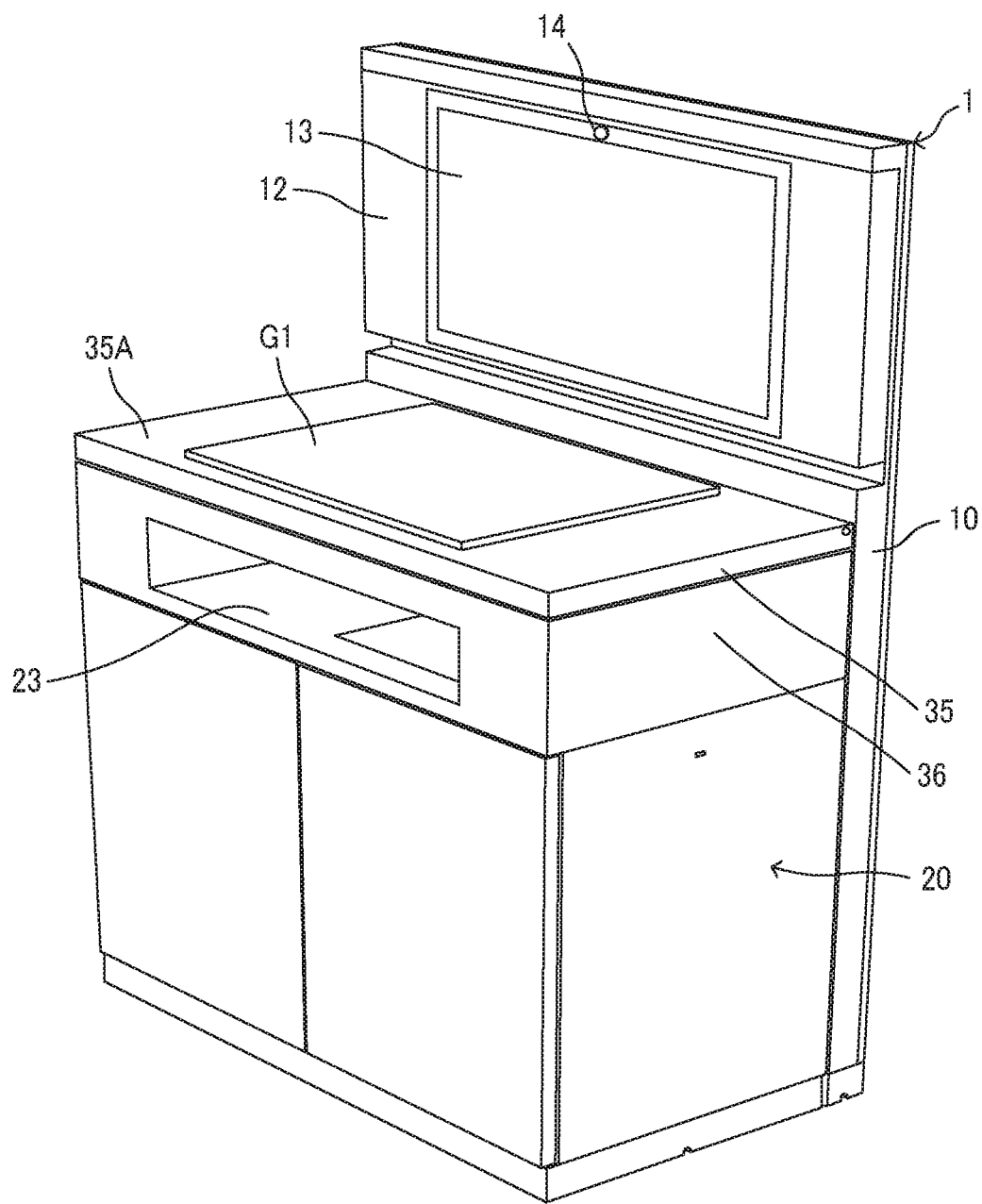
FIG. 4 is a perspective view of the image forming apparatus of FIG. 1 where an upward document is captured.

A camera unit 14 that serves as an imaging device is arranged in front of the upper part of the panel unit 10, and the camera unit 14 according to the present embodiment is provided for a display 12. The display 12 can be detached from the panel unit 10 together with the display 12 by removing the screws at the fastening positions 11B. The camera unit 14 is arranged in front of the upper part of the panel unit 10, and can capture a capturing area on the front side of the apparatus from the front of the upper part of the panel unit 10. As illustrated in FIG. 4, as will be described later in detail, a user places an upward document G1 such that the rear side of the plane to be captured of an upward document G1 such as a paper document or a book faces the upward-document mounting table 35A (holding surface), which consists of the top surface of the image forming unit 20 (i.e., the top surface of a document holding cover 35 of a downward document scanner 30 as will be described later), and captures the top surface of the upward document (plane to be captured) with the camera unit 14. Accordingly, the image of an upward document can be read and obtained. The camera unit 14 outputs the picture signals of the read and obtained image (i.e., the captured image) to a control unit as which will be described later in detail. The control unit controls a storage device to store the image data that is based on the input picture signals. The term capture or capturing used herein includes, for example, scanning an upward document to obtain the image of the upward document. In other words, the term capture or capturing may include any method of obtaining the image of an upward document.

Figure 5:
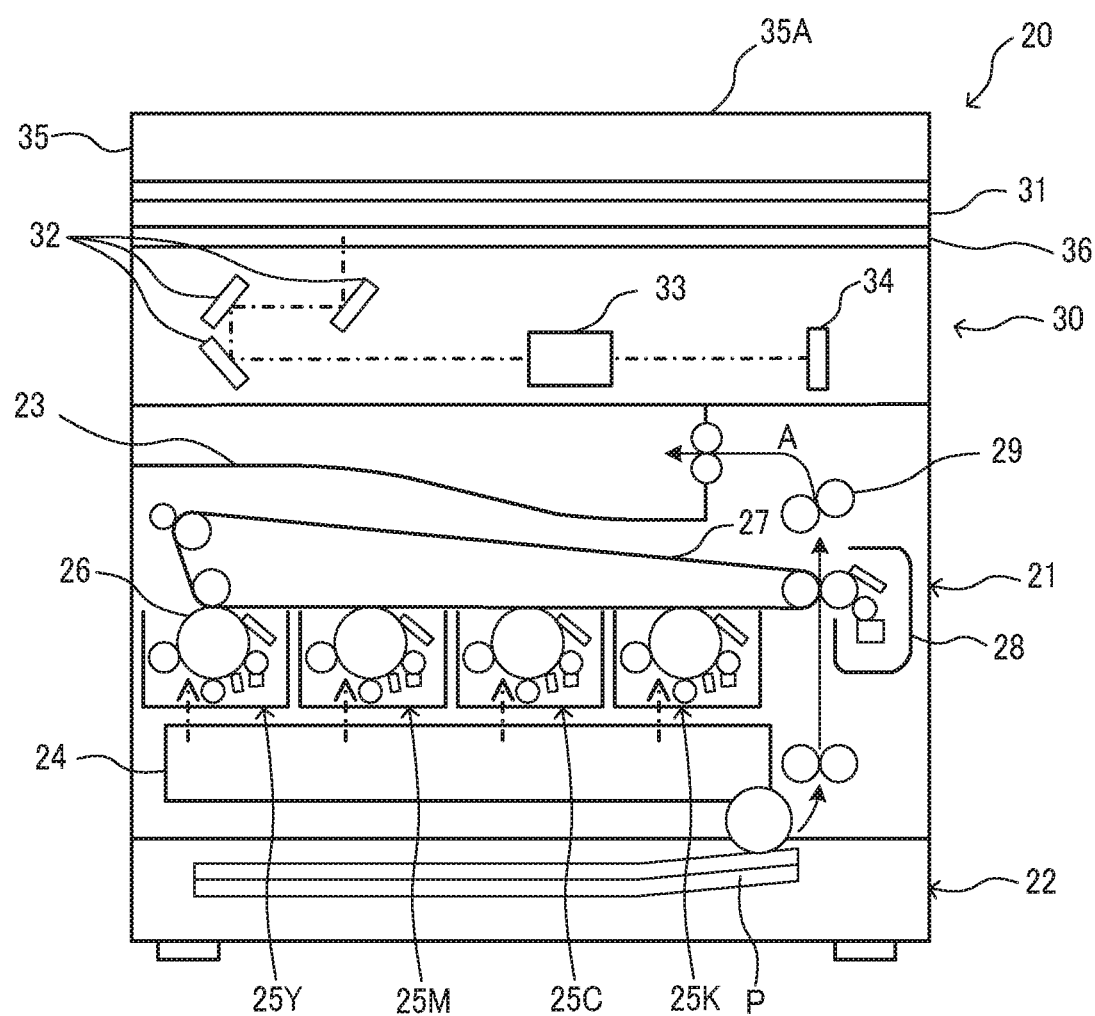
FIG. 5 is a schematic view of the inner structure of the image forming unit of the image forming apparatus of FIG. 1.

FIG. 5 is a schematic view of the inner structure of the image forming unit 20 according to the present embodiment. An image formation processing unit 21 is approximately arranged in the middle of the image forming unit 20, and a sheet feeder 22 is arranged under the image formation processing unit 21. Moreover, a downward document scanner 30, which reads an image of the backside of a downward document G2 (to-be-scanned surface) placed on a contact glass 31, is arranged above the image formation processing unit 21 across the ejected-sheet storage 23. Note that the downward document scanner 30 serves as an image reading unit. In the ejected-sheet storage 23, a sheet P that serves as a recording material, on which an image is formed, is ejected and stored. The route indicated by the arrows A in FIG. 5 indicates the sheet-passing route of the sheet P.

In the image formation processing unit 21, a plurality of image forming units 25Y, 25M, 25C, and 25K are arranged side by side so as to face an intermediate transfer belt 27. Moreover, an exposure device 24 that serves as a latent image forming device is disposed under the image forming units 25Y, 25M, 25C, and 25K. The indexes Y, M, C, and K included in the reference signs of these image forming units 25Y, 25M, 25C, and 25K correspond to the colors of toner used by the respective units or the like. When it is not necessary to distinguish the colors of toner in the following description, these indexes may be omitted.

Each of the image-forming units 25 is provided with a drum-shaped photoreceptor 26. For example, a charging device that serves as a charger and evenly charges the surface of the photoreceptor 26, a developing device that develops a latent image formed on the surface of the photoreceptor 26 by the exposure device 24, a primary transfer device that transfers a toner image obtained by developing a latent image by the developing device onto an intermediate transfer belt 27 in the primary transfer process, and a cleaner that removes and retrieves, for example, transfer residual toner that remains on the surface of the photoreceptor after the primary transfer are arranged around the photoreceptor 26.

The toner image on the intermediate transfer belt 27 obtained as the toner images on the multiple photoreceptors 26 are superimposed on top of one another in the primary transfer process is transferred onto the sheet P by a secondary transfer device 28 in the secondary transfer process. The sheet P onto which the toner image has been transferred by the secondary transfer device 28 is conveyed to a fixing device 29, and the toner on the sheet P is fixed by the fixing device 29. The paper P on which the image has been fixed by the fixing device 29 goes through an output roller pair and are ejected and stored in the ejected-sheet storage 23.

In the downward document scanner 30, in order to scan the image of the downward document G2 placed on the contact glass 31, a movable scanning unit 32 provided with a mirror and a light source to irradiate the document with light moves back and forth in line with the contact glass 31. The light reflected by the document is received by a charge coupled device (CCD) 34 arranged in the subsequent stage of the lens 33. The CCD 34 converts the received light into picture signals, and outputs the obtained picture signals to a control unit. The control unit controls a storage device to store the image data that is based on the input picture signals.

Figure 6:
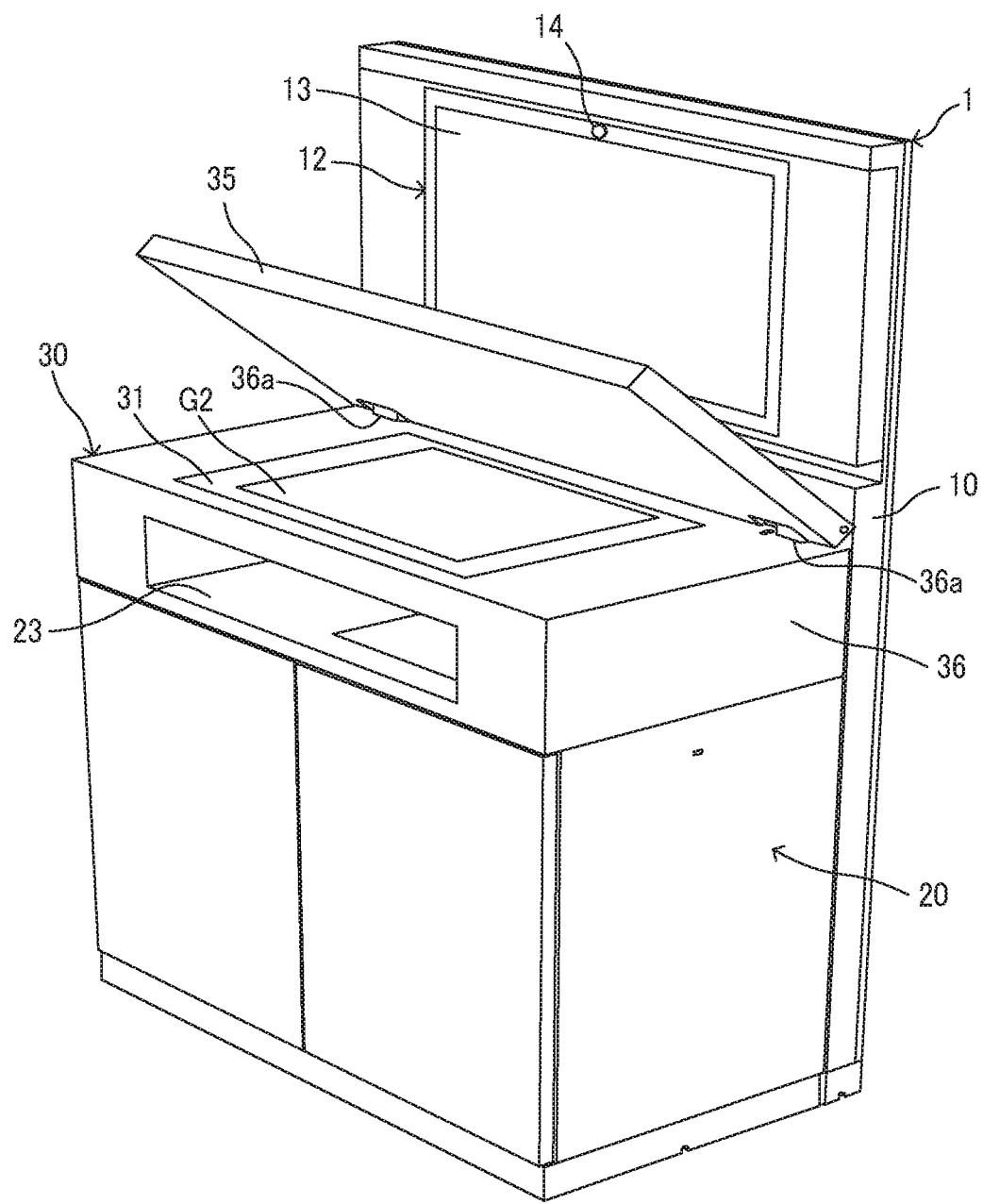
FIG. 6 is a perspective view of the image forming apparatus of FIG. 1 where a downward document is captured.

As illustrated in FIG. 6, a document holding cover 35 that serves as an open/close member in relation to the contact glass 31 is attached to the downward document scanner 30 by hinges 20*a* arranged at the rear of a scanner housing 36 (contact glass supporting member) that supports the contact glass 31 in an openable and closable manner. When the image of the downward document G2 placed on the contact glass 31 is to be scanned, the document holding cover 35 is opened as illustrated in FIG. 6, and the document holding cover 35 is closed after the downward document G2 is placed on the contact glass 31 such that the backside of the downward document G2 (plane to be captured) faces the contact glass 31.

When the image of the upward document G1 (i.e., the image of the upward document G1 obtained by capturing operation) read and obtained by the above camera unit 14 or the image of the downward document G2 read and obtained by the downward document scanner 30 is to be printed on a sheet P, the control unit controls the operation or driving of the light source (for example, a laser diode (LD)) of the exposure device 24 based on the image data of these read and obtained images. For example, the writing light emitted from the laser diode reaches the surfaces of the multiple photoreceptors 26 through a polygon mirror or a lens. Accordingly, electrostatic latent images that correspond to the image data are formed on the surfaces of the photoreceptors 26. The toner image obtained by developing the above electrostatic latent images by the multiple developing devices are transferred onto the intermediate transfer belt 27 in the primary transfer process. Then, the toner image on the intermediate transfer belt 27 is transferred onto the sheet P by the secondary transfer device 28 in the secondary transfer process, and is fixed by the fixing device 29. Finally, the sheet P on which an image is formed is ejected and stored in the ejected-sheet storage 23.

An electrophotographic method is adopted as the image-forming method in the present embodiment. However, any other image-forming method such as ink-jet printing may be adopted.

The top surface of the image forming unit 20 according to the present embodiment i.e., the top surface of a document holding cover 35 of a downward document scanner 30, is approximately flat. Due to this configuration, the top surface of a document holding cover 35, which serves as the upward-document mounting table 35A that holds the upward document G1, may also be used as the top surface of the video-conference table. For example, the image forming apparatus 1 may be used as a table unit of a video-conference table.

In the present embodiment, the camera unit 14 that captures the upward document G1 is arranged in front of the upper part of the panel unit 10, and the top surface of the upward document G1 (plane to be captured) placed on the upward-document mounting table 35A is captured in a slanting direction with reference to the direction of the normal (approximately vertical direction) to the top surface of the document holding cover 35 (the upward-document mounting table 35A) in a closed state. Due to such a configuration as above, compared with the related art example where the camera unit is arranged in front above the top surface of the upward document G1, the space (facing space) above the top surface of the document holding cover 35 (the upward-document mounting table 35A) can be utilized without the disturbance of the camera unit 14, and the customer convenience of a user improves.

For example, when a user places a notepad or the like on the upward-document mounting table 35A and writes a memo or the like thereon using pens or pencils, the user can do his or her work without being bothered by the camera unit 14. Alternatively, for example, when a user places his or her laptop personal computer (PC) on the upward-document mounting table 35A and does some key-entry operations. Even in this case, the user can do his or her work without being bothered by the camera unit 14.

In the present embodiment, in particular, the camera unit 14 (more specifically, the optical component at the forward end of the camera unit 14 in the optical-axis direction) is configured so as not to protrude from the front surface of the panel unit 10 towards the front of the apparatus. The upward-document mounting table 35A on which the upward document G1 is placed is arranged so as to extend from the front surface of the panel unit 10 towards the front of the apparatus. Accordingly, the camera unit 14 according to the present embodiment is arranged outside the facing space where the face of a user and the top surface of the upward document G1 placed on the upward-document mounting table 35A face each other. The camera unit 14 may be arranged inside the facing space (upper space). When the camera unit 14 is arranged outside the upper space in a video-conference table as in the present embodiment, the disturbance of the camera unit 14 is reduced, and the customer convenience improves.

Moreover, in the present embodiment, the camera unit 14 (more specifically, the optical component at the forward end of the camera unit 14 in the optical-axis direction) is arranged near the boundary of the upper space (facing space) (in the present embodiment, slightly outside the boundary of the upper space) that faces the top surface of the upward document G1 placed on the upward-document mounting table 35A. As described above, when the upward-document mounting table 35A is arranged at a minimum distance from the camera unit 14 in the forward and backward directions of the image forming apparatus 1 (in other words, when the upward-document mounting table 35A is arranged such that the distance in the forward and backward directions of the image forming apparatus 1 is minimized), the dimensionalities of the image forming apparatus 1 in the forward and backward directions can further be reduced. Accordingly, wider space can be achieved in front of the image forming apparatus 1 according to the present embodiment.

Further, when the upward-document mounting table 35A is arranged at a minimum distance from the camera unit 14 in the forward and backward directions of the image forming apparatus, the distance between a user who does various kinds of operation in front of the image forming apparatus 1 and the front surface of the panel unit 10 on which the camera unit 14 is disposed is reduced. In the present embodiment, in particular, the above distance is controlled such that a user who stands or sits in front of the image forming apparatus 1 can easily reach the front surface of the panel unit 10 with arm length. Due to this configuration, the user can easily touch the touch panel 13 that is mounted on the front surface of the panel unit 10.

As in the present embodiment, in a configuration where the upward-document mounting table 35A is arranged at a minimum distance from the camera unit 14 in the forward and backward directions of the apparatus, the camera unit 14 needs to be specially configured such that the capturing area of the camera unit 14 covers the entirety of the upward document G1 placed on the upward-document mounting table 35A. In other words, when the camera unit 14 arranged in front of the upper part of the panel unit 10 is provided with a standard lens and the image-capturing direction (optical-axis direction) is oriented in the horizontal direction with reference to the front of the apparatus (in other words, when the optical-axis direction of the camera unit 14 is perpendicular to the direction of the normal (approximately vertical direction) to the upward-document mounting table 35A), the entirety of the upward document G1, which is placed on the upward-document mounting table 35A arranged at a minimum distance from the camera unit 14 in the forward and backward directions of the apparatus, cannot be covered within the capturing area.

In order to handle such a situation, in the present embodiment, the image-capturing direction (optical-axis direction) of the camera unit 14 is oriented obliquely downward with reference to the front of the apparatus. In other words, the optical-axis direction of the camera unit 14 is inclined with reference to the direction of the normal (approximately vertical direction) to the upward-document mounting table 35A. Accordingly, the entirety of the upward document G1, which placed on the upward-document mounting table 35A arranged at a minimum distance from the camera unit 14 in the forward and backward directions of the apparatus, is covered within the capturing area of the camera unit 14.

Moreover, in the present embodiment, a camera unit 14 is provided with a wide-angle lens whose angle of view is wider than that of a standard lens in order to achieve a wider capturing area and extend the use of the camera unit 14. The camera unit 14 according to the present embodiment is expected to be capable of capturing not only the upward document G1 but also other objects in varying conditions. The wide-angle lens used in the present embodiment is a lens whose focal length is shorter than 35 millimeters (mm). In the present embodiment, in order to achieve the function of capturing the face of a user of the image forming apparatus 1 according to the present embodiment by the camera unit 14, the camera unit 14 is configured such that the upward document G1 placed on the upward-document mounting table 35A as well as the position of the face of the user of the image forming apparatus 1 according to the present embodiment (i.e., the position in front of the apparatus) will be covered together within the capturing area of the camera unit 14. For such purposes, it is desired that a super wide-angle lens whose focal length is shorter than 24 mm be used. As the function of capturing the face of a user of the image forming apparatus 1 according to the present embodiment by the camera unit 14 is implemented, a user of the image forming apparatus 1 according to the present embodiment may be authenticated, or video conference (visual video telephone) may be carried out using the image forming apparatus 1 according to the present embodiment.

The document holding cover 35 is built to be openable and closable independently of the panel unit 10, and thus the panel unit 10 does not collapse backward when the document holding cover 35 is opened. Due to this structure, it is not necessary to install the image forming apparatus 1 according to the present embodiment such that the rear is in full contact with the rear wall, and the footprint of the image forming apparatus 1 according to the present embodiment in the forward and backward directions can be prevented from enlarging. Accordingly, wide space can be allocated in front of the image forming apparatus 1 according to the present embodiment.

Figure 7:
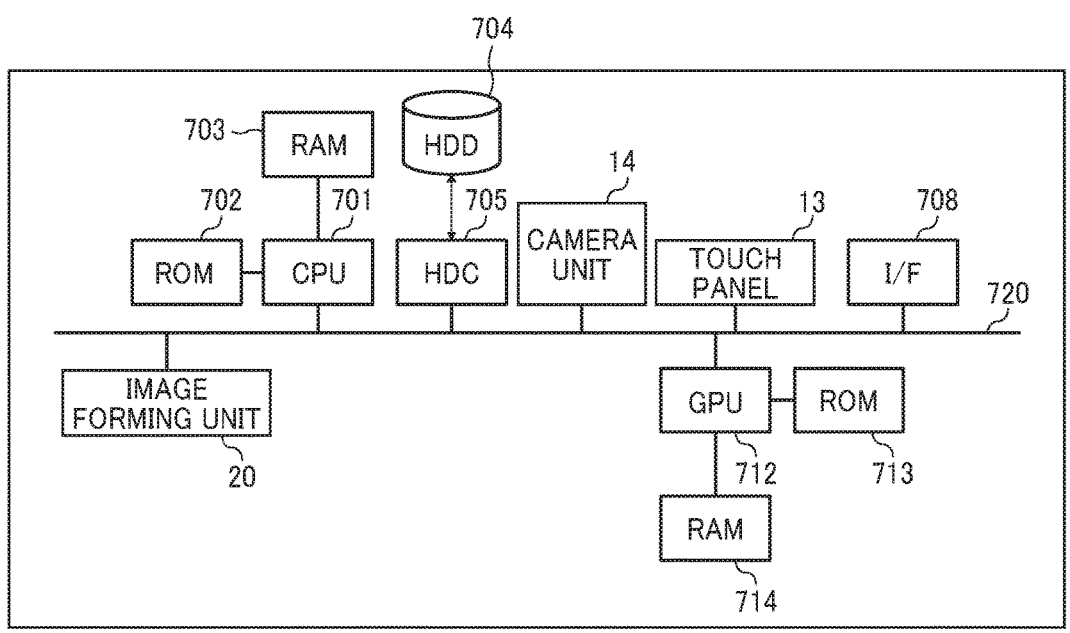
FIG. 7 is a block diagram of a hardware configuration of the main control of the image forming apparatus of FIG. 1.

FIG. 7 is a block diagram of a hardware configuration of the main control of the image forming apparatus 1 according to the present embodiment. As described above, the image forming apparatus 1 according to the present embodiment includes the control unit where a central processing unit (CPU) 701, a read only memory (ROM) 702, a random access memory (RAM) 703, a hard disk drive (HDD) 704, a hard disk controller (HDC) 705, an external interface (I/F) 708, and a graphics processing unit (GPU) 712 are coupled to each other through an extension bus line 720, in addition to the image forming unit 20 and the display 12 provided with the touch panel 13 and the camera unit 14.

The CPU 701 controls the entire operation of the image forming apparatus 1. The ROM 702 stores a control program used by the CPU 701. The RAM 703 is mainly used as a work area in which the CPU 701 executes a program. The HDD 704 stores a program or various kinds of data. The HDC 705 controls reading or writing of various kinds of data to or from the HDD 704 under control of the CPU 701. The external interface 708 performs the transmission and reception of data with an external device through the wired or wireless communication network. The ROM 713 that stores a control program used for driving the GPU 712 and the RAM 714 that is used as a work area in which the GPU 712 executes a program are coupled to the GPU 712, and the GPU 712 performs various kinds of image processing. The extension bus line 720 is, for example, an address bus or a data bus, which electrically connects various elements as described above.

The touch panel 13 can detect a position on the screen touched or closely approached by an object to be detected such as a stylus or a finger of a user. Its detection method is not limited to any particular method, and any known method may widely be used.

according to, for example, the position of the target object (touch point) detected by the touch panel 13 or the changes (movement) in touch point over time For example, the CPU 701 controls the display of an image displayed on the screen of the touch panel 13. For example, the CPU 701 displays an image at the touch point on the screen of the touch panel 13, and controls the display of the touch panel 13 to display, for example, a character or drawing, which is drawn by the trajectory of the touch point, on the screen. Moreover, the CPU 701 controls the display of the touch panel 13 to, for example, move, rotate, switch, enlarge, or resize the image being displayed on the screen according to the touch point or movement made on the screen of the touch panel 13.

For example, the GPU 712 performs image processing to correct the distortion or remove the image portion other than the image of the upward document G1 (for example, background image or a finger of a user) from the image data of the upward document G1 captured and extracted by the camera unit 14. In particular, the camera unit 14 according to the present embodiment captures the top surface of the upward document G1 (plane to be captured) placed on the upward-document mounting table 35A, in a slanting direction with reference to the direction of the normal (approximately vertical direction) to the upward-document mounting table 35A. Due to this configuration, the image of the upward document G1 obtained by capturing performed by the camera unit 14 is different from the image obtained by capturing the top surface of the upward document G1 (plane to be captured) from the right above. For this reason, the GPU 712 corrects the distortion such that the image data of the upward document G1 captured by the camera unit 14 becomes equivalent to the image obtained by capturing the top surface of the upward document G1 (plane to be captured) in the direction of the normal to the upward-document mounting table 35A.

Moreover, the GPU 712 perform image processing to generate the added image (hand-drawn image) based on the coordinate data of the touch point detected by the touch panel 13, and performs display control to superimpose the hand-drawn image on the image already displayed on the screen of the touch panel 13.

The camera unit 14 can also capture a still image or record video data of, for example, a user's face or scenery, in addition to the capturing of the upward document G1. Alternatively, image data may be read from an external device such as a mobile device or a portable recording medium that is connected to the apparatus through the external interface 708, and be displayed on the touch panel 13 or printed on the sheet P by the image forming unit 20. It is desired that the screen of the touch panel 13 be made of a material such as a glass from which ink is easily erasable, such that an image can be drawn by, for example, an ink pen for whiteboard. When the image forming apparatus 1 according to the present embodiment is to be used as a whiteboard, for example, a plain white image is displayed on the screen of the touch panel 13 to improve the viewability of ink image drawn by an ink pen or the like.

Figure 8:
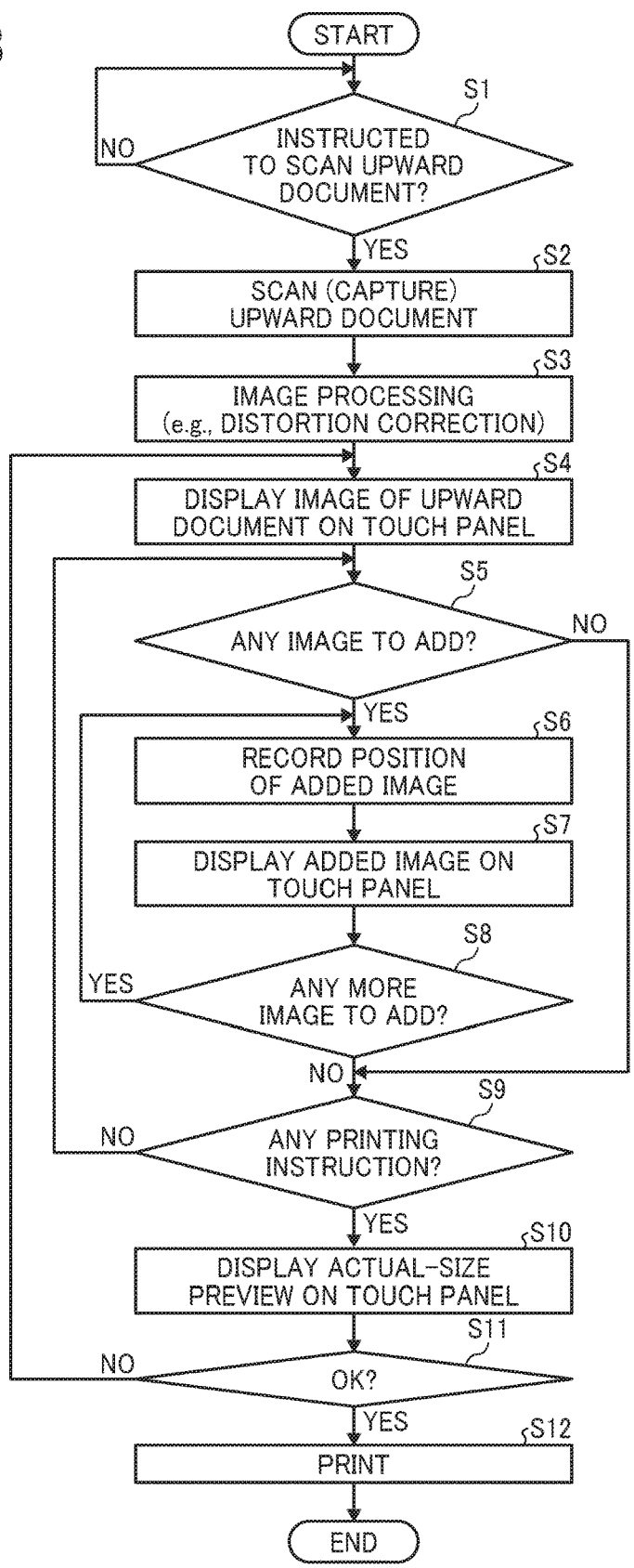
FIG. 8 is a flowchart of the processes performed by the image forming apparatus of FIG. 1.

FIG. 8 is a flowchart of the processes performed by the image forming apparatus 1 according to the present embodiment.

Figure 9:
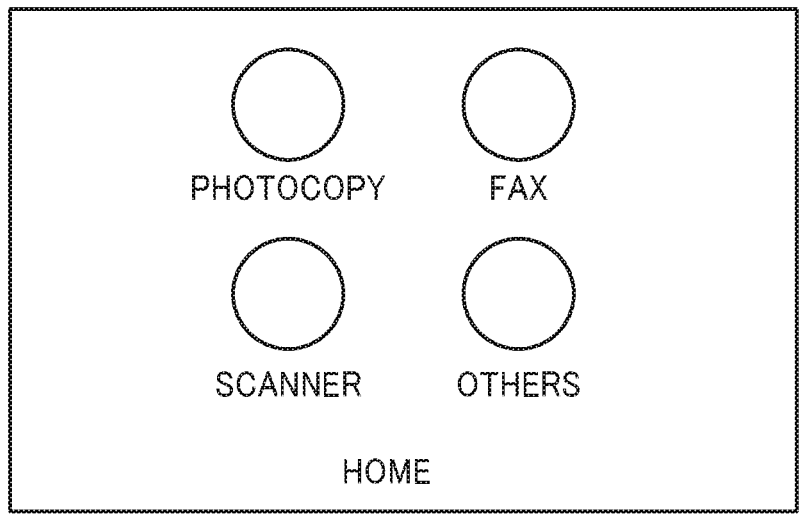
FIG. 9 is a schematic diagram illustrating a home screen displayed on the screen of a touch panel of the image forming apparatus of FIG. 1.
Figure 10:
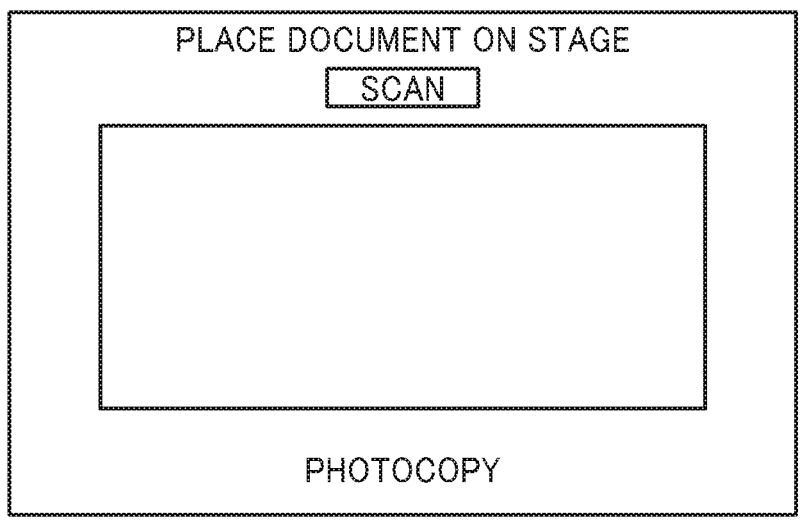
FIG. 10 is a schematic diagram illustrating a screen that appears when an image is to be captured in a mean time after the "photocopying" button on the home screen displayed on the screen of FIG. 9 is touched to select photocopying function.

FIG. 9 to FIG. 12 are schematic diagrams illustrating various kinds of example screens displayed on the touch panel 13, according to the present embodiment. When the image forming apparatus 1 according to the present embodiment is turned on, firstly, a home screen is displayed on the screen of the touch panel 13 as illustrated in FIG. 9. When a button image to select photocopying function is touched and selection is made on the subsequently-appearing selection screen to scan the upward document between the downward document and upward document (S1), the display on the touch panel 13 shifts to the photocopying screen as illustrated in FIG. 10, and the camera unit 14 is turned on and starts operating. On this photocopying screen, only the image portion captured by the upward-document mounting table 35A is extracted from the image obtained by capturing performed by the camera unit 14 (an image including the upward-document mounting table 35A and the upper-body of a user (including the face)) and displayed by the GPU 712. Due to this configuration, a user can check the image of the upward document G1 placed on the upward-document mounting table 35A by viewing the photocopying screen. Then, once a user touches the "scan" button on the photocopying screen as illustrated in FIG. 10, the camera unit 14 executes imaging operation (S2) after a predetermined length of time (for example, two seconds) has elapsed.

The captured image data obtained as above goes through image processing (S3) where the GPU 712 removes the image portion other than the image of the upward document G1 (for example, background image or a finger of a user) or corrects the distortion. Such data that has gone through image processing as above is read as the image data of the upward document G1, and the obtained image data is displayed on the screen of the touch panel 13 by the GPU 712 (S4). In so doing, the display may be controlled such that the image of the upward document G1 may be displayed on the screen of the touch panel 13 in the same size (actual size) as the size of the image on the sheet on which the upward document G1 placed on the upward-document mounting table 35A is printed. Alternatively, the image of the upward document G1 may be enlarged to the maximum displayable size and displayed on the screen of the touch panel 13.

Figure 11:
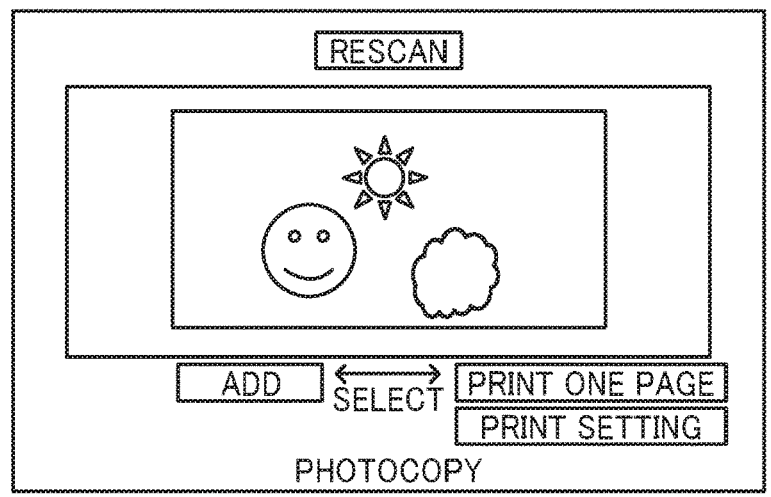
FIG. 11 is a schematic diagram illustrating a screen image displayed on the screen of FIG. 10 when a horizontally-oriented A4 document is captured after the photocopying function is selected.

When the "rescan" button on the photocopying screen as illustrated in FIG. 11 is touched, the document can be scanned (captured) again by the camera unit 14. The size of the sheet on which the image of the upward document G1 is printed may be the same size as the paper size of the upward document G1. However, no limitation is indicated thereby, and for example, a user may choose the paper size to be used for printing after a button image to select photocopying function is touched (S1).

When a user wishes to print the document image displayed on the screen of the touch panel 13, the user touches the "print one page" button on the photocopying screen as illustrated in FIG. 11 ("NO" in S5, "YES" in S9). By so doing, the document image displayed on the screen of the touch panel 13 (i.e., the image to be printed) is previewed on the screen of the touch panel 13 in the same size (actual size) as the size of the image printed on the sheet P (S10). In the example preview image as illustrated in FIG. 11, the image to be printed on the horizontally oriented sheet P of A4 size is previewed in actual size on the screen of the touch panel 13. In the present embodiment, for example, the image to be printed on the vertically oriented sheet P of A4 size may also be previewed in actual size on the screen of the touch panel 13.

Then, the preview image previewed in actual size on the touch panel 13 (i.e., an estimated image to be printed on the sheet P) is checked, and a user makes instructions to execute printing operation (S11). As a result, the image data of the image to be printed is sent to the image forming unit 20, and an image is printed on the sheet P of A4 size in the image forming unit 20 based on the received image data (S12). Then, the sheet P is ejected to the ejected-sheet storage 23, and the photocopying operation is completed.

By touching a "print setting" button on the photocopying screen as illustrated in FIG. 11, the print setting such as the size of printing paper, the magnifying power of an image to be printed, and changes in the number of sheets to be printed may be changed as desired. When the size of printing paper or the magnifying power of an image to be printed is changed in the print setting and the actual size is changed, preview is done on the screen of the touch panel 13 in the changed actual size.

In the present embodiment, a user may add a hand-drawn image to the document image displayed on the screen of the touch panel 13, and the image to which such a hand-drawn image has been added may be printed. In order to achieve such operation, the user touches an "add" button on the photocopying screen as illustrated in FIG. 11 ("YES" in S5). In order for the user to add the above hand-drawn image to the document image easily, it is desired that the document image that was displayed in actual size be magnified.

Figure 12:
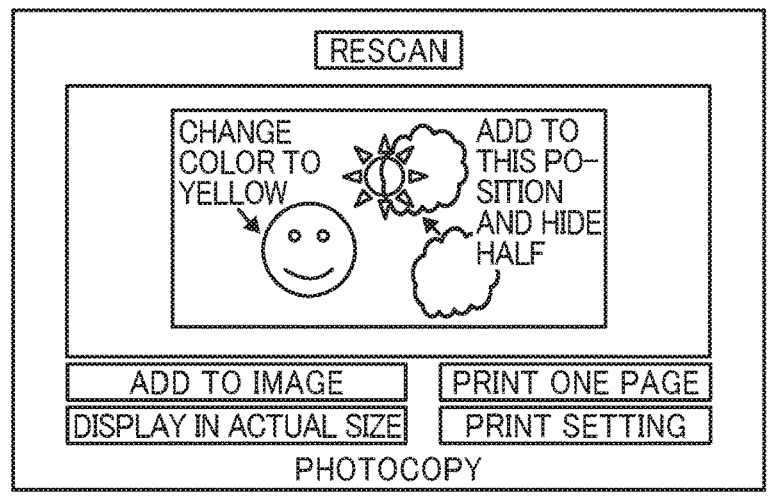
FIG. 12 is a schematic diagram illustrating a magnified view of a document image on which an added hand-drawn image has been superimposed, after a photocopying function is selected, according to an embodiment of the present disclosure.

When a user touches the document image displayed on the touch panel 13, for example, by his or her finger, the touch point detected by the touch panel 13 is detected, and the coordinate data of the detected touch point is recorded (step S6). Then, the added image (hand-drawn image) is generated based on the recorded coordinate data, and as illustrated in FIG. 12, display control is performed and the hand-drawn image is superimposed on the image already displayed on the screen of the touch panel 13 (S7). In the present embodiment, the document image is magnified when the above hand-drawn image is added to the document image. Accordingly, a fine line, small character, or the like that cannot easily be added when the document image is displayed in actual size can easily be added to the document image.

The user may touch the "display in actual size" button on the screen when necessary to controls the display to display in actual size the document image on which the added hand-drawn image has been superimposed. By so doing, the user can check in actual size the document image on which the added hand-drawn image has been superimposed. Accordingly, whether the added hand-drawn image is too small to be visually recognizable can be checked. When the added hand-drawn image is difficult to be visually recognizable, the "magnify" button on the screen may be touched to control the display again to magnify the document image on which the hand-drawn image has been superimposed. Then, a new hand-drawn image may be added after deleting the old hand-drawn image.

When the user wishes to print the document image onto which a hand-drawn image has been added as described above, the user touches the "print one page" button on the screen ("YES" in S8, "YES" in S9). Accordingly, the document image, onto which a hand-drawn image has been added, is previewed on the screen of the touch panel 13 (i.e., the image to be printed) in the same size (actual size) as the size of the image printed on the sheet P (S10). Then, the preview image previewed in actual size on the touch panel 13 is checked, and the user makes instructions to execute printing operation (S11). Accordingly, the image data of the image to be printed is sent to the image forming unit 20. As a result, an image is printed on the sheet P of A4 size in the image forming unit 20 based on the received image data (S12), and the sheet P on which the added hand-drawn image has been printed is ejected to the ejected-sheet storage 23.

In the present embodiment, description is given of an example in which photocopying function is executed. Note that the reading or scanning processes for the upward document G1 (i.e., the capturing processes) in the scanner function or facsimile function are similar to the reading or scanning processes for the upward document G1 (i.e., the capturing processes) in the photocopying function as described above. The data of read and obtained image (i.e., the image obtained by capturing operation) or the document image on which the added hand-drawn image has been superimposed may be stored in a portable recording medium without printing operation, or may be transmitted to an external device through the communication network. The image that is obtained by reading or scanning the downward document G2 by the downward document scanner 30 may be handled in a similar manner to the upward document G1 as described above.

In the present embodiment, the upward-document mounting table 35A may be used as a whiteboard. In such a configuration, it is desired that the upward-document mounting table 35A be made of a material where ink is easily erasable. The image that is drawn by hand using an ink pen on the upward-document mounting table 35A is captured by the camera unit 14 in a similar manner to the upward document G1, and the obtained image data is sent to the image forming apparatus 1. Due to this configuration, the preview in actual size and printing can be executed on the screen of the touch panel 13.

In the present embodiment, when a user makes instructions to select video conference function, video conference with a remote site may be implemented using the camera unit 14, a microphone unit, and a loudspeaker unit through the communication network. In such a configuration, for example, the document image displayed on the touch panel 13 or the document image on which the added hand-drawn image has been superimposed may be shared through the communication network.

In the above embodiments of the present disclosure, the image forming unit 20 that is heavier than the display 12 is arranged under the display 12. Due to this arrangement, the center of gravity of the entirety of the image forming apparatus 1 is kept low, and the image forming apparatus 1 can be prevented from falling over.

<Modification>

Next, one modification of the video-conference table according to the above embodiments is described. The image forming apparatus 1 according to the embodiment as described above captures the upward document G1, which is placed on the upward-document mounting table 35A that is the top surface of the image forming unit 20 (i.e., the top surface of a document holding cover 35 of a downward document scanner 30), in an obliquely upward direction using the camera unit 14 arranged in front of the upper part of the panel unit 10. By contrast, the image forming apparatus 1 that serves as a table unit according to the present modification of the above embodiments captures a forward-turned document G3, which is held on a document holding surface 10A that is approximately parallel to a vertical plane, in an obliquely downward direction using the camera unit 14 arranged in front on the top surface of the image forming unit 20. The other configurations or operations of the present modification are similar to those of the embodiments of the present disclosure as described above. For this reason, differences from the embodiments of the present disclosure as described above are described in the following description of the present modification.

Figure 13:
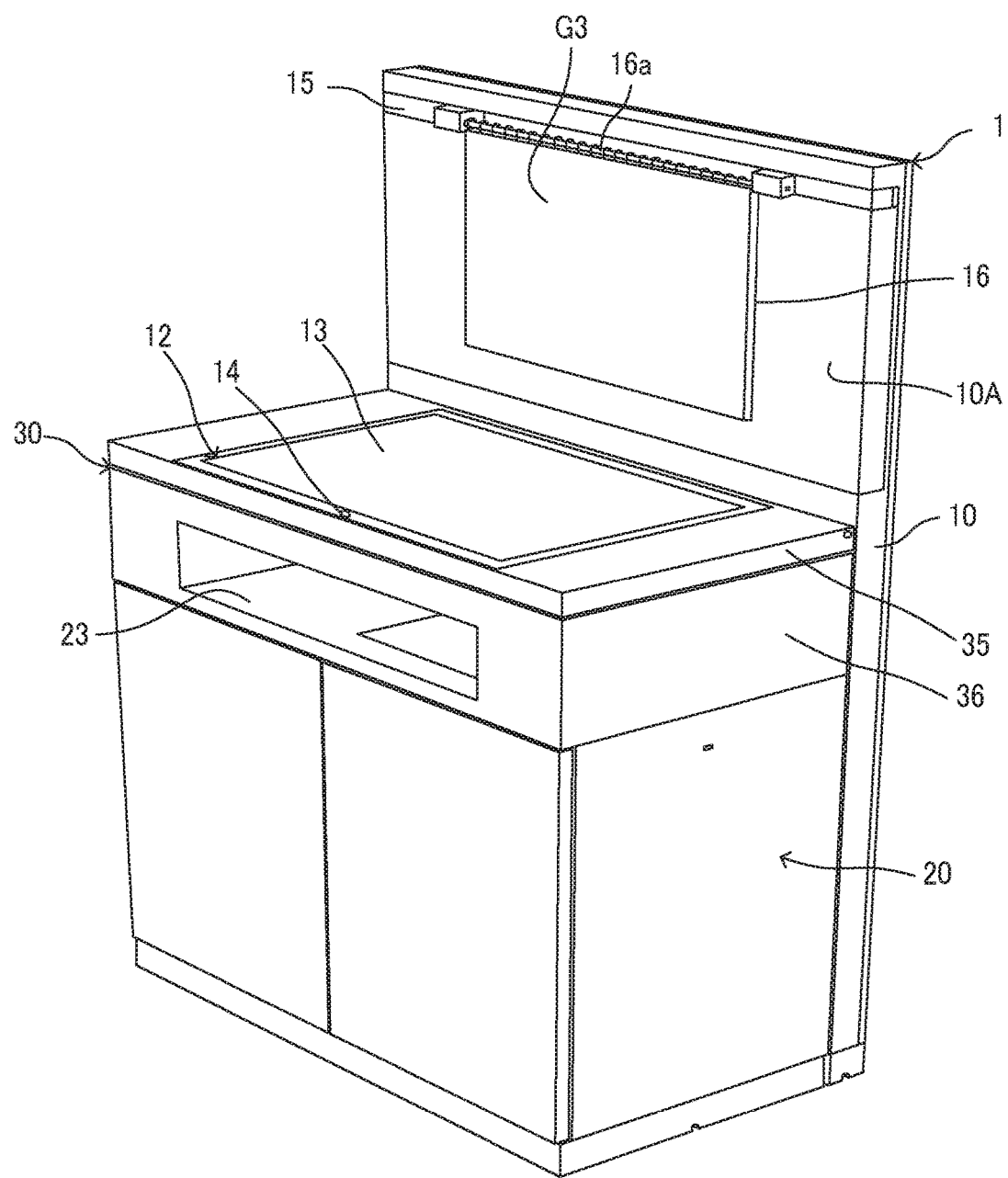
FIG. 13 is a front perspective view of an image forming apparatus according to a modification of an embodiment of the present disclosure.

FIG. 13 is a front perspective view of the image forming apparatus 1 that serves as a table unit, according to the present modification of the above embodiments. The image forming apparatus 1 according to the present modification includes the plate-shaped panel unit 10 and the image forming unit 20 in a similar manner to the embodiments of the present disclosure as described above, and Moreover, the image forming unit 20 is mounted in front of the lower part of the panel unit 10, and the upper part of the panel unit 10 extends upward from the rear of the image forming unit 20.

Figure 14:
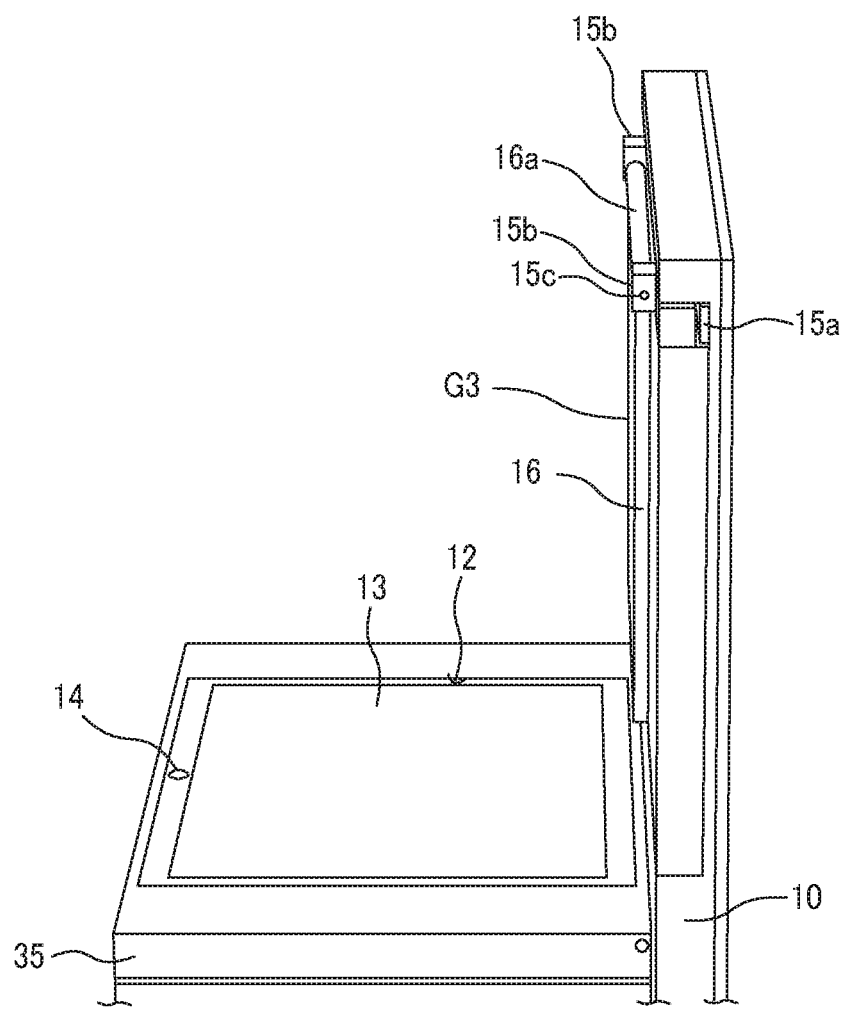
FIG. 14 is a perspective view of a configuration (in-use condition) of a document holder that holds a forward-turned document in front of the upper part of the panel unit, in the image forming apparatus of FIG. 13.

FIG. 14 is a perspective view of a configuration (in-use condition) of a document holder 15 that holds the forward-turned document G3 in front of the upper part of the panel unit 10, in the image forming apparatus 1 of FIG. 13. In the present modification, a document holder 15 is disposed in front of the upper part of the panel unit 10. The document holder 15 is a part used to hang a sketchbook or a croquis book like a flip chart to use the hung scketchbook or croquis book as a batch of memo pads 16 for recording hand drawing thereon. As illustrated in FIG. 14, the document holder 15 according to the present modification of the above embodiments are provided with a wall-fixed part 15a, a back-and-forth movable part 15b, and a document attaching part 15c.

The batch of memo pads 16 such as a sketchbook or a croquis book is hung as a document attaching part 15c shaped like a bar passes through a helical ring 16a that binds a plurality of pages of memo pads and both edges of the document attaching part 15c are attached to a pair of back-and-forth movable parts 15b, and is held in front of the upper part of the panel unit 10. The memo paper of the batch of memo pads 16 may be refilled when it runs out.

When a user does hand drawing on the memo paper of the batch of memo pads 16 using a pen or the like, it is easier for the user to do the hand drawing when the gap between the batch of memo pads 16 and the front surface of the upper part of the panel unit 10 that holds the batch of memo pads 16 is small. For this reason, in the present modification, as illustrated in FIG. 14, the gap between the batch of memo pads 16 and the front surface of the upper part of the panel unit 10 is configured to be reduced in a in-use condition. On the other hand, when the gap between the batch of memo pads 16 and the front surface of the upper part of the panel unit 10 is too small, it is difficult to turn the used sheet of memo pad (i.e., the memo pad that comes in the foreground of the batch of memo pads 16) to the rear end of the batch of memo pads 16.

Figure 15:
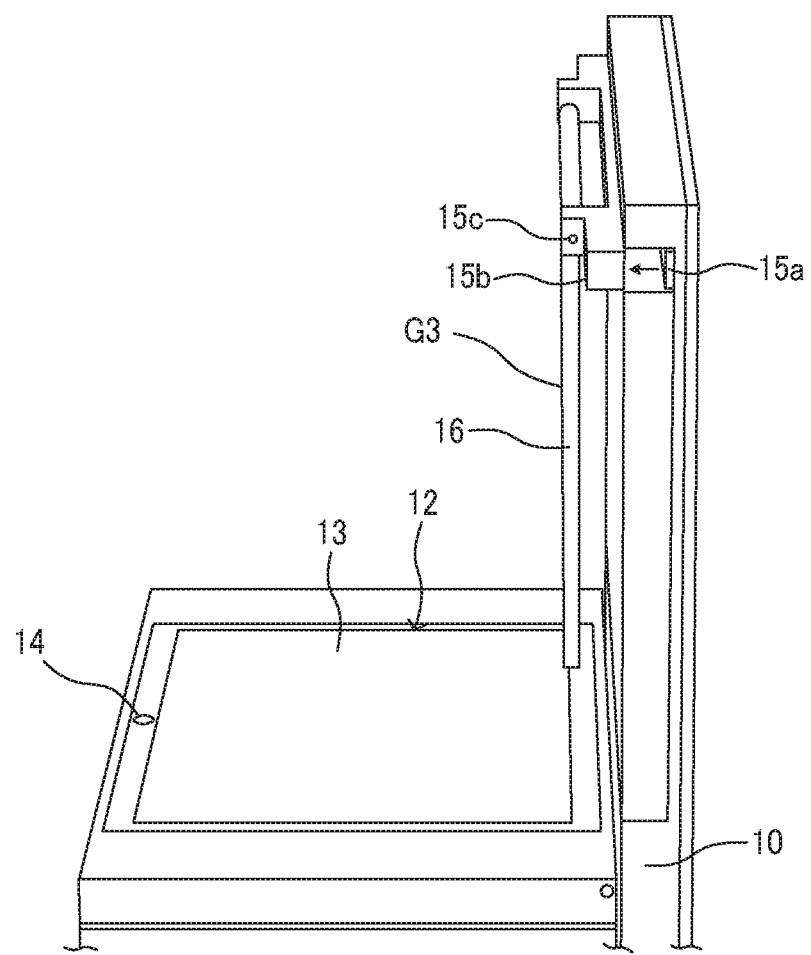
FIG. 15 is a perspective view of a configuration (turned condition) of a document holder that holds a forward-turned document in front of the upper part of the panel unit, in the image forming apparatus of FIG. 13.

In order to handle such a situation, in the present modification, as illustrated in FIG. 15, the back-and-forth movable part 15b that supports the document attaching part 15c where the batch of memo pads 16 is hung is attached to the wall-fixed part 15a that holds the document holder 15 onto the panel unit 10 in a slidable manner to the front side of the apparatus. When a user turns the used sheet of memo pad to the rear of the batch of memo pads 16, as illustrated in FIG. 15, the user slides the back-and-forth movable part 15b towards the front side of the apparatus. By so doing, the gap between the batch of memo pads 16 and the front surface of the upper part of the panel unit 10 expands, and it becomes easier for the user to turn the sheet. In order to implement sliding movement of the back-and-forth movable part 15b, a push latch mechanism may be adopted. In such cases, when the back-and-forth movable part 15b is lightly pressed in an in-use condition as illustrated in FIG. 14, the back-and-forth movable part 15b is unlocked, and as illustrated in FIG. 15, due to the pressing force of the spring, the back-and-forth movable part 15b is supported in a state where the back-and-forth movable part 15b is slid to the front side of the apparatus by a predetermined amount. When the user wishes to bring the back-and-forth movable part 15b back to the in-use condition as illustrated in FIG. 14, the back-and-forth movable part 15b is pressed towards the rear side against the pressing force of the spring. As a result, the back-and-forth movable part 15b is locked, and the back-and-forth movable part 15b is maintained in the in-use condition. Alternatively, other kinds of holding method may be employed. For example, the forward-turned document G3 may be clamped by a paper clip and held on the front surface (holding surface) of the panel unit 10.

In the present modification, the display 12 is disposed at the top of the image forming unit 20. The display 12 according to the present modification of the above embodiment is disposed on the document holding cover 35 of the downward document scanner 30 in the image forming unit 20, and is provided with the touch panel 13 on the top surface. The screen of the touch panel 13 has a size similar to that of the embodiments of the present disclosure as described above.

In the present modification, the camera unit 14 is arranged on the top surface of the image forming unit 20, and is integrated with the display 12 in a similar manner to the embodiments of the present disclosure as described above. The camera unit 14 is arranged on the front surface of the upper part of the image forming unit 20, and can capture a capturing area on the front side of the upper part of the panel unit 10. A user holds the forward-turned document G3 such that the rear side of the forward-turned document G3 faces the front surface (holding surface) of the upper part of the panel unit 10, and captures the front surface (plane to be captured) of the forward-turned document G3 using the camera unit 14. By so doing, the image of the forward-turned document G3 can be read and obtained. The image signals of the image obtained by capturing performed by the camera unit 14 are output to the control circuit in a similar manner to the embodiments of the present disclosure as described above.

Also in the present modification, the document holding surface 10A that is the front surface of the panel unit 10 is arranged near the camera unit 14 in the vertical direction. In a similar manner to the embodiments of the present disclosure as described above, it is specially configured such that the capturing area of the camera unit 14 covers the entirety of the forward-turned document G3 placed on the document holding surface 10A of the panel unit 10.

Figure 16:
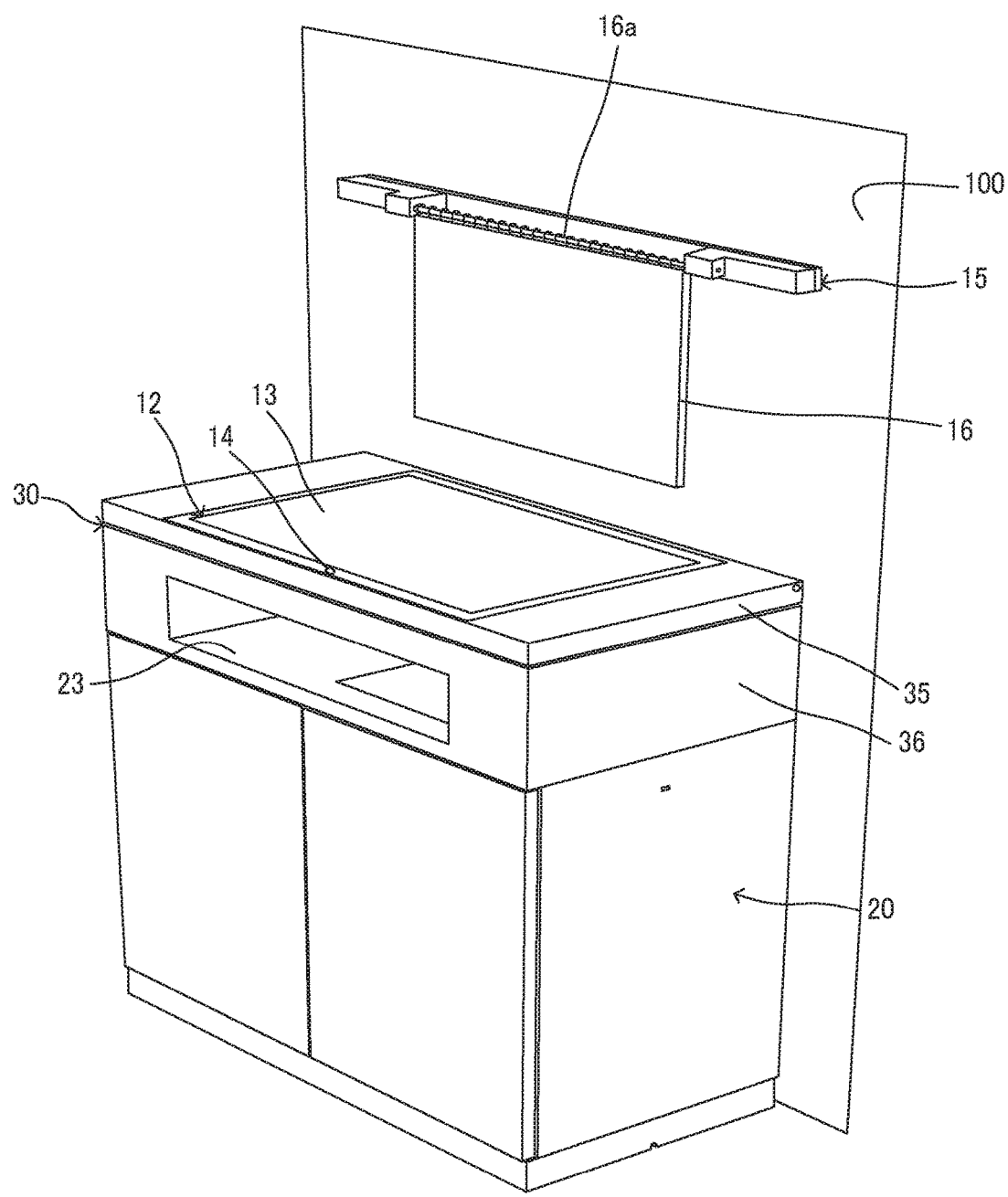
FIG. 16 is a perspective view of a configuration in which a forward-turned document held on the wall of the room is captured, according to an embodiment of the present disclosure.

In the image forming apparatus 1 according to the present modification of the above embodiments, the document holding surface 10A of the panel unit 10 that is fitted to the rear of the image forming unit 20 serves as the holding surface of the forward-turned document G3. However, as illustrated in FIG. 16, the wall 100 of the room where the image forming apparatus 1 is arranged may serve as the holding surface of the forward-turned document G3. In such a case, the document holder 15 that holds the forward-turned document G3 is fitted to the wall 100 at the rear of the image forming apparatus 1. In such arrangement, the panel unit 10 can be omitted. Accordingly, the cost of components can be reduced, and the dimensionalities of the image forming apparatus 1 in the forward and backward directions can be reduced. Moreover, wider space can be allocated in front of the image forming apparatus 1.

In the present modification of the embodiments as described above, the display 12 into which the camera unit 14 is integrated may be configured in a detachable manner with reference to the image forming unit 20, and a document holding unit provided with the document holder 15 and the document holding surface 10A of the panel unit 10 may be configured in a detachable manner with reference to the panel unit 10. Moreover, the installed positions of the display 12 and the document holding unit may be exchanged.

Figure 17:
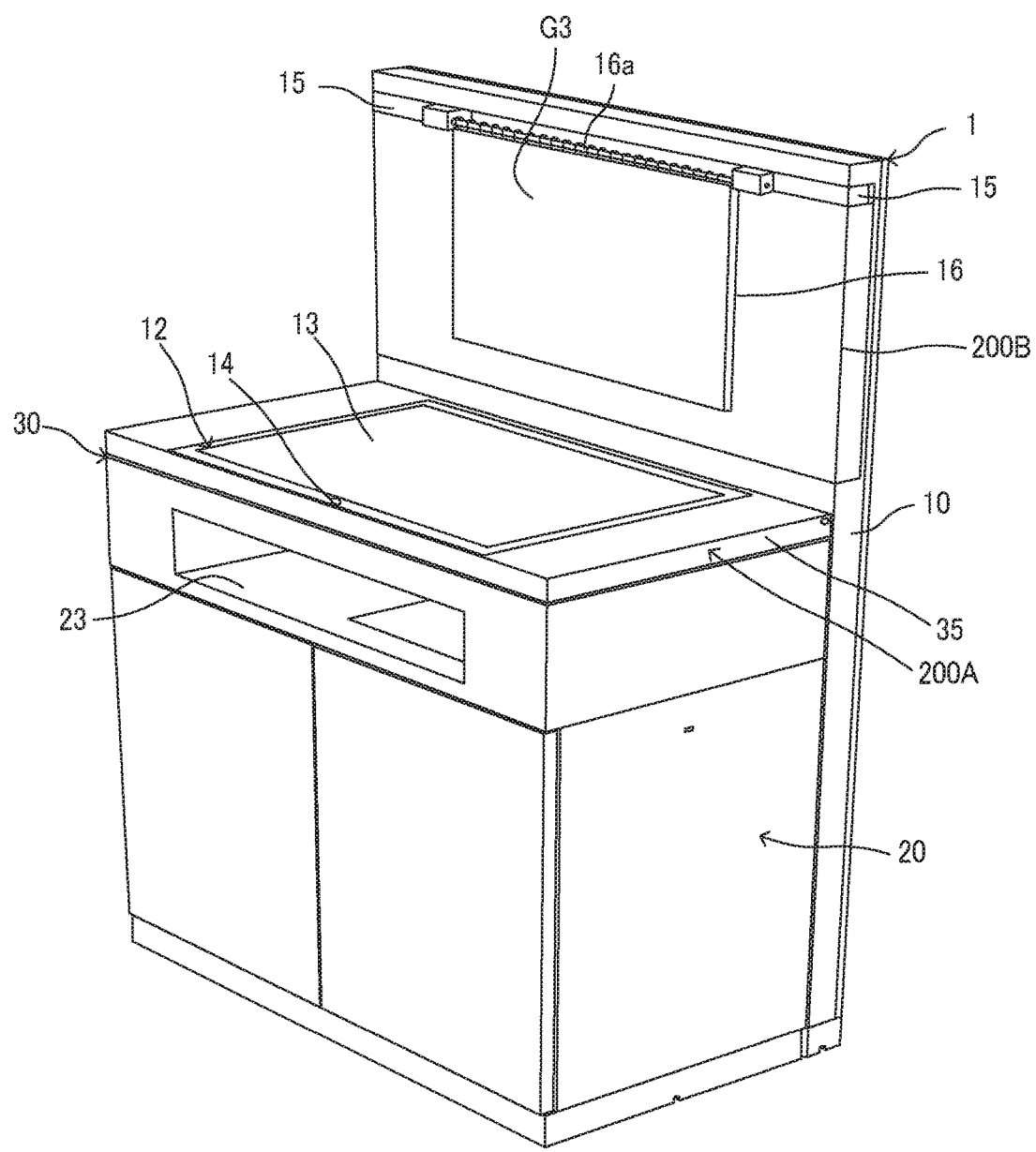
FIG. 17 is a perspective view of a configuration where the installed positions of a display unit provided with a display and a camera unit and a document holding unit provided with a document holder and a part of a panel unit at the front can be exchanged, according to an embodiment of the present disclosure.

For example, as illustrated in FIG. 17, the document holding cover 35 for which the display 12 is disposed may be configured as a display unit 200A, and this display unit 200A is detachable from the image forming unit 20. On the other hand, a document holding unit 200B provided with the document holder 15 and the document holding surface 10A of the panel unit 10 is built to have dimensionalities compatible with the display unit 200A, and the document holding unit 200B is configured in a detachable manner with reference to the panel unit 10. In such a configuration, the document holding unit 200B may be attached to the position where the display unit 200A has been removed from the image forming unit 20, and the display unit 200A may be attached at the position where the document holding unit 200B has been removed from the panel unit 10. In this configuration, the document holding unit 200B substantially serves as the document holding cover 35.

Figure 18:
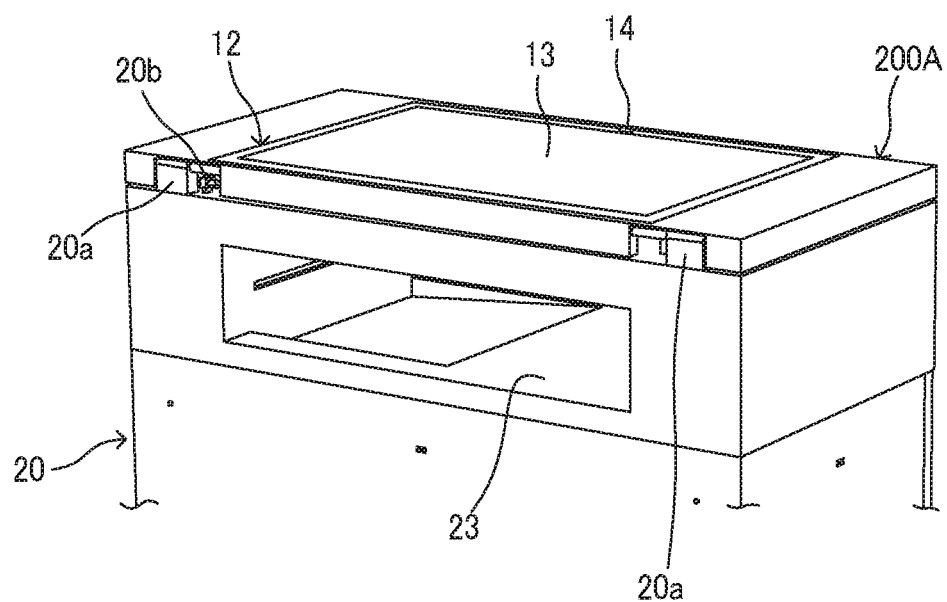
FIG. 18 is a perspective view of a configuration of hinges of an image forming unit by which the display unit and the document holding unit as illustrated in FIG. 18 are fixed, according to an embodiment of the present disclosure.

Regarding the fixation of the display unit 200A or the document holding unit 200B onto the image forming unit 20 in the above configuration, as illustrated in FIG. 18, the holding parts of the display unit 200A or the document holding unit 200B are fixed to the hinges 20a of the image forming unit 20. As illustrated in FIG. 18, a wiring connecting part 20b such as signal lines or power supply cables, whch is coupled to the control circuit of the image forming apparatus 1, is arranged close to the hinges 20a of the image forming unit 20, and is coupled to the connectors of the display unit 200A or the document holding unit 200B when the display unit 200A or the document holding unit 200B are fitted to the image forming unit 20. The panel unit 10 is also provided with a similar wiring connecting part 20b, and is coupled to the connectors of the display unit 200A or the document holding unit 200B when the display unit 200A or the document holding unit 200B are fitted to the panel unit 10.

In the above usage pattern as illustrated in FIG. 1 where the document holding unit 200B is fitted to the image forming unit 20, the document holder 15 is not necessary. For this reason, it is desired that the document holder 15 be removed from the document holding unit 200B, or it is desired that the document holder 15 be configured not to protrude from the top surface of the document holding unit 200B (that corresponds to the document holding surface 10A of the panel unit 10).

Due to such an exchangeable configuration as described above, the usage pattern where the screen of the display 12 is approximately parallel to the vertical plane (i.e., the usage pattern where the upward document G1 is placed on the top surface of the image forming unit 20 and the image of the upward document G1 is captured) as illustrated in FIG. 1 and the usage pattern where the screen of the display 12 is approximately parallel to the horizontal plane (i.e., the usage pattern where the forward-turned document G3 is held on the front surface of the panel unit 10 and the image of the forward-turned document G3 is captured) as illustrated in FIG. 13 can be switched according to user's preference.

Figure 19:
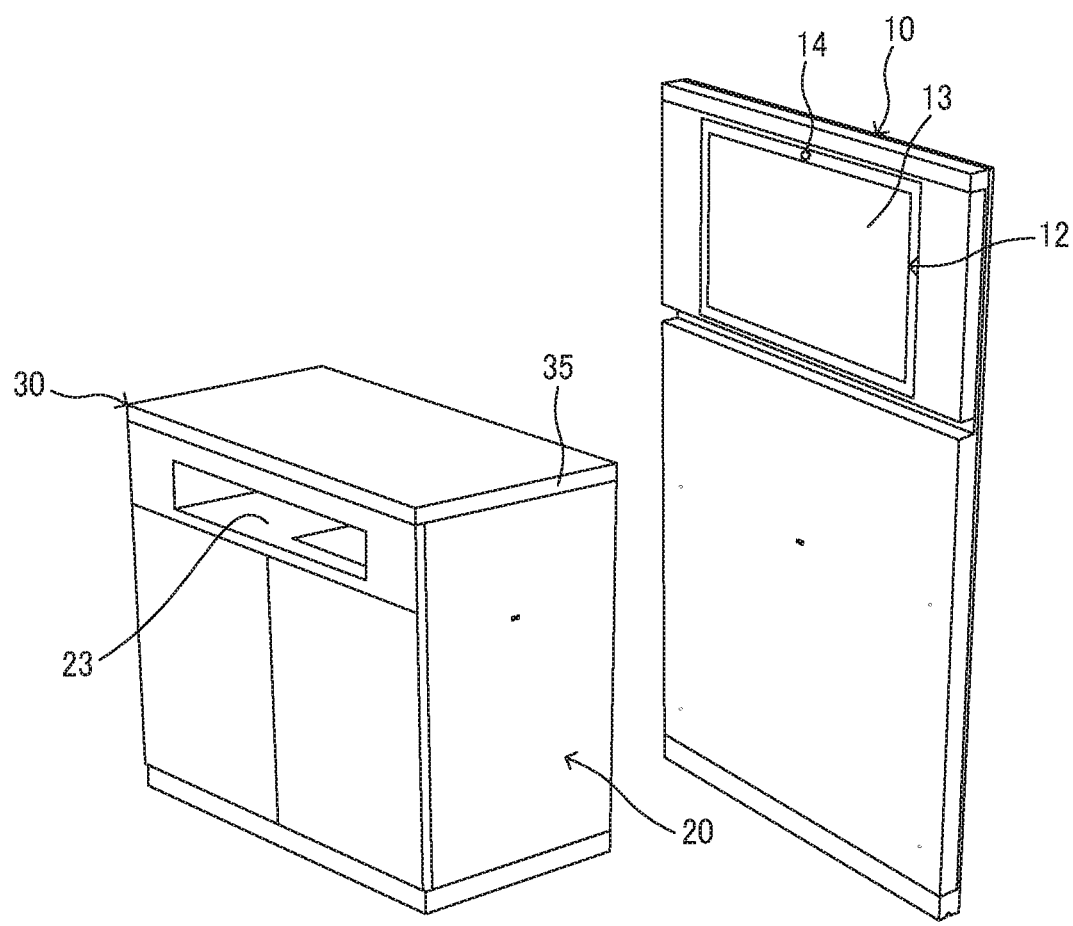
FIG. 19 is a perspective view of an image forming apparatus where the panel unit is separated from the image forming unit, according to an embodiment of the present disclosure.

Next, various kinds of example cases where the image forming apparatus 1 is used, in the embodiments of the present disclosure and their modifications as described above, are described. As described above, in the image forming apparatus 1 according to the present embodiment, as illustrated in FIG. 19, the panel unit 10 can be detached from the image forming unit 20 by removing these screws at the fastening positions 11A. The same can be said of the image forming apparatus 1 according to the modification of the embodiments of the present disclosure. Even if the panel unit 10 and the image forming unit 20 are separated from each other, a means of communication between the panel unit 10 and the image forming unit 20 can be achieved through a wireless or wired connection. Due to this configuration, the panel unit 10 and the image forming unit 20 can be used in a state where the panel unit 10 and the image forming unit 20 are separated from each other.

Figure 20:
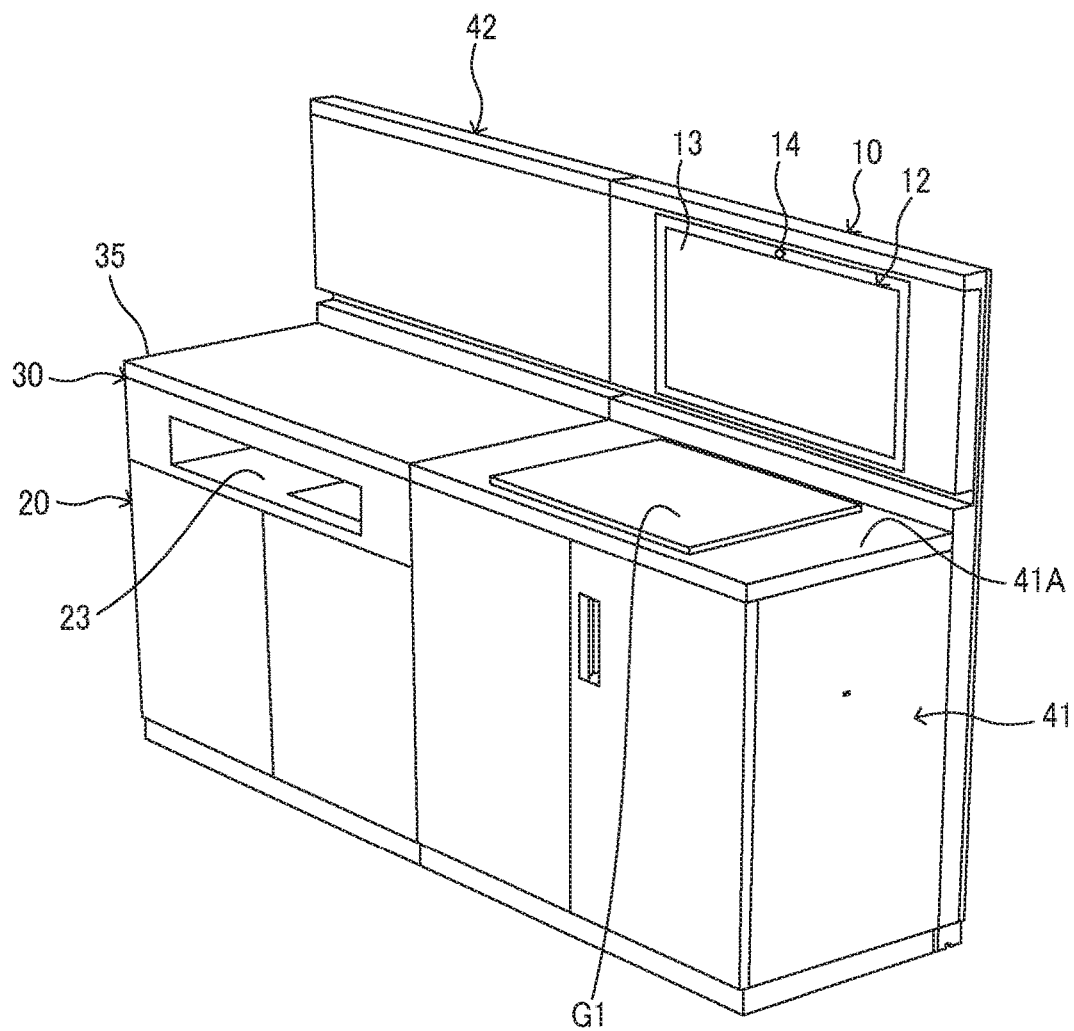
FIG. 20 is a perspective view of an example case where an image forming apparatus according to an embodiment of the present disclosure is used.

FIG. 20 is a perspective view of an example case where the image forming apparatus 1 according to the embodiment as described above is used. This example case illustrates a video-conference system having an imaging system where the apparatus on the left side of FIG. 20 and the apparatus on the right side of FIG. 20 are coupled to each other in the horizontal direction. The apparatus that is positioned on the left side of FIG. 20 is an image forming apparatus where a partition panel 42 of the same size as the panel unit 10 is not attached to the panel unit 10 but is attached at the rear of the image forming unit 20 of the image forming apparatus 1 according to the present embodiment as described above. On the other hand, the apparatus that is positioned on the right side of FIG. 20 is a video-conference table where the panel unit 10 of the image forming apparatus 1 according to the embodiment as described above is not attached to the image forming unit 20 but is attached to a cabinet 41 of the same size as the image forming unit 20. In this video-conference table, the top surface of the cabinet 41 serves as a holding surface on which the upward document G1 is placed. In this system, the top surface of the image forming unit 20 of the image forming apparatus on the left side of FIG. 20 is approximately flush with the top surface of the cabinet 41 of the video-conference table on the right side of FIG. 20.

Figure 21:
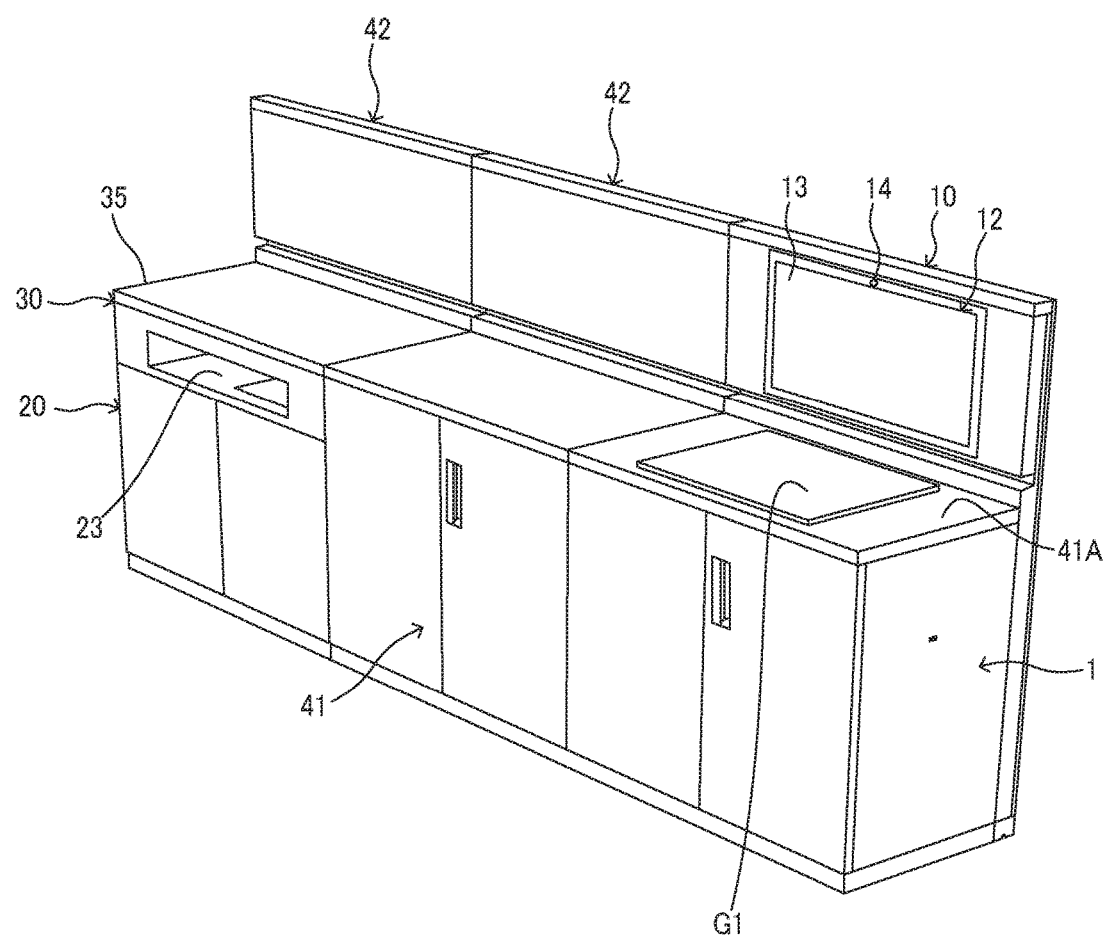
FIG. 21 is a perspective view of another example case where an image forming apparatus according to an embodiment of the present disclosure is used.

FIG. 21 is a perspective view of another example case where the image forming apparatus 1 according to the embodiment as described above is used. This example case illustrates a video-conference system where a partition where a partition panel 42 of the same size as the panel unit 10 is attached at the rear of the cabinet 41 of the same size as the image forming unit 20 is placed between the apparatus on the left side of FIG. 20 and the apparatus on the right side of FIG. 20 in the example case as illustrated in FIG. 20.

Figure 22:
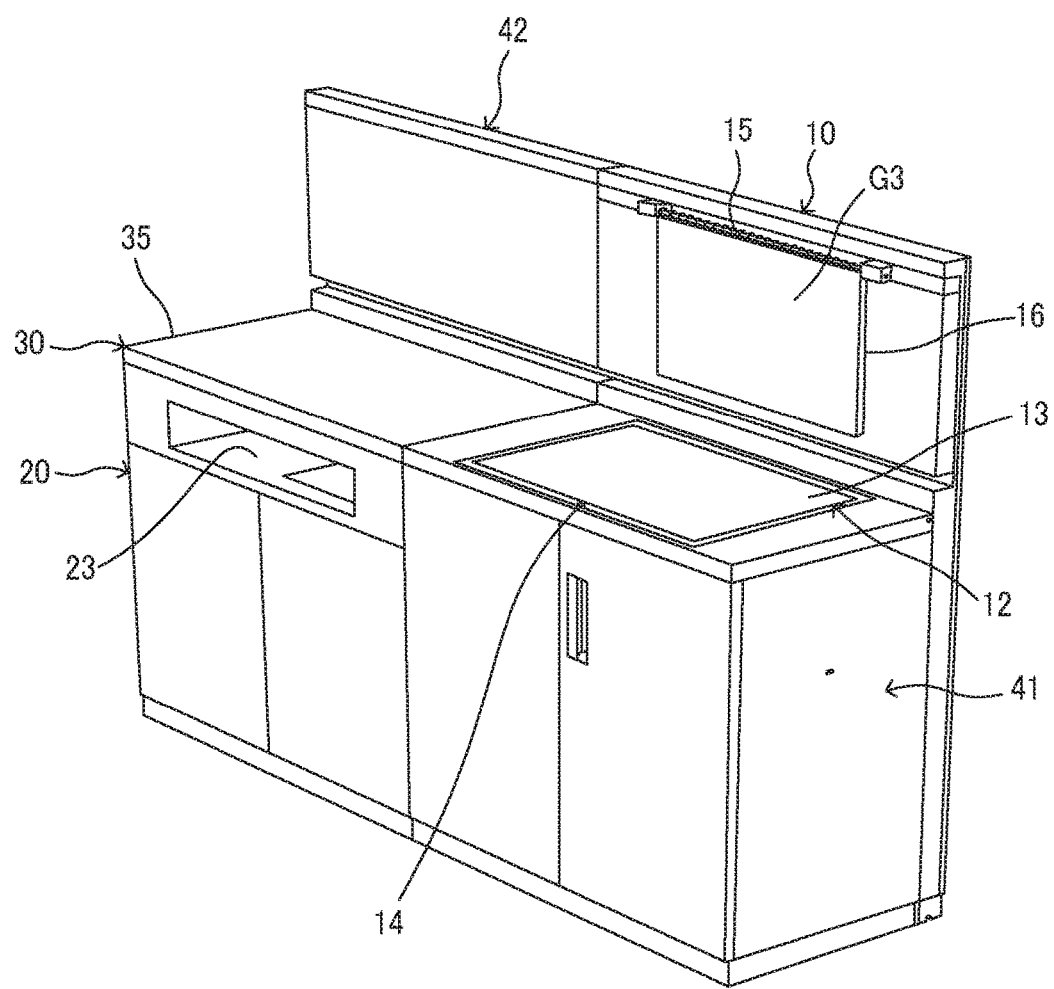
FIG. 22 is a perspective view of an example case where an image forming apparatus according to a modification of an embodiment of the present disclosure is used.

FIG. 22 is a perspective view of an example case where the image forming apparatus 1 according to the above modification is used. This example case illustrates a video-conference system where the apparatus on the left side of FIG. 22 and the apparatus on the right side of FIG. 22 are coupled to each other in the horizontal direction. The apparatus that is positioned on the left side of FIG. 22 is equivalent to the image forming apparatus on the left side of the example case as illustrated in FIG. 20. On the other hand, the apparatus that is positioned on the right side of FIG. 22 is a video-conference table where the display 12 (including the camera unit 14), which was mounted on the image forming unit 20 of the image forming apparatus 1 according to the modification as described above, is not attached to the image forming unit 20 but is attached to a cabinet 41 of the same size as the image forming unit 20. In this video-conference table, the image of the forward-turned document G3 can be obtained by capturing the forward-turned document G3 that is held on the document holding surface 10A of the panel unit 10, using the camera unit 14 of the display 12 mounted on the cabinet 41. In this system, the top surface of the image forming unit 20 of the image forming apparatus on the left side of FIG. 22 is approximately flush with the top surface of the display 12 of the video-conference table on the right side of FIG. 22.

With the example cases as illustrated in FIG. 20 to FIG. 22, the image of the downward document G2 can be read in parallel using the downward document scanner 30 of the image forming unit 20 even while the image of the upward document G1 or the forward-turned document G3 is being read using the camera unit 14.

It may be configured such that a plurality of image forming units 20 or a plurality of camera units 14 be controlled by a single display 12.

Figure 23:
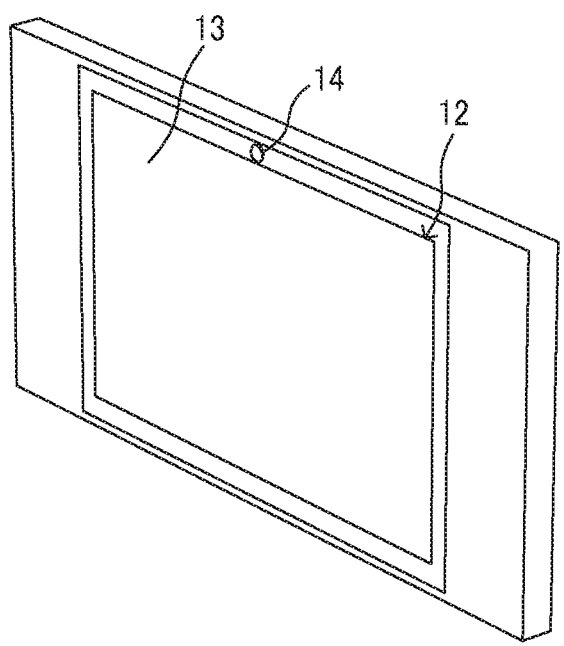
FIG. 23 is a perspective view of a display separated from a panel unit of an image forming apparatus according to an embodiment of the present disclosure.

As described above, in the image forming apparatus 1 according to the present embodiment, as illustrated in FIG. 23, the panel unit 10 can be detached from the display 12 by removing these screws at the fastening positions 11B. The same can be said of the image forming apparatus 1 according to the modification of the embodiments of the present disclosure. The display 12 that is separated from other components as above may be used on its own upon being placed on the desk or hung on the wall of the room. For example, the display 12 as illustrated in FIG. 23 is placed on the desk on its own and a forward-turned document is held on the wall of the room. Accordingly, a forward-turned document can be read and obtained with the usage pattern as illustrated in FIG. 16.

The embodiments described above are given as an example, and advantageous effects are achieved for each of the following modes A to Q.

<Mode A>

A video-conference table includes an imaging device such as the camera unit 14 that captures an object to be captured such as the upward document G1 and the forward-turned document G3 held on a holding surface such as the upward-document mounting table 35A, the document holding surface 10A, and the wall 100. The imaging device is disposed outside facing space that faces the object to be captured on the holding surface, and captures the object to be captured on the holding surface in a slanting direction with reference to a normal-line direction of the holding surface. According to the present mode, compared with the known imaging apparatus where the imaging device is arranged in front of the plane to be captured of the object to be captured, the facing space of the holding surface can be utilized without the disturbance of the imaging device.

<Mode B>

The video-conference table according the above Mode A includes an image processing device such as the GPU 712 configured to perform image processing including, for example, distortion correction where image data obtained by capturing of the imaging device is corrected to image data obtained when the surface of the object to be captured is captured in a normal-line direction of the holding surface. According to the present mode, while the facing space of the holding surface can be utilized without the disturbance of the imaging device, the image that is when the surface of an object to be captured is captured in the normal-line direction of the holding surface can be obtained.

<Mode C>

In the above mode A or B, the imaging device includes an imager such as the camera unit 14 configured to capture a front side of the object to be captured whose rear side is held on the holding surface, and the imaging device includes an optical component at a forward end of the imager in an optical-axis direction disposed near a boundary of the facing space that faces the front side of the object to be captured on the holding surface. According to the present mode, while the facing space of the holding surface can be utilized without the disturbance of the imaging device, the video-conference table can be downsized.

<Mode D>

In any one of the above modes A to C, the imaging device includes an imager such as the camera unit 14 configured to capture a front side of the object to be captured whose rear side is held on the holding surface, and an optical-axis direction of the imager is inclined with reference to a normal-line direction of the holding surface. According to the present mode, even wheh an optical component at a forward end of the imager in an optical-axis direction is arranged near the holding surface, the capturing area of the imager can cover the entire plane to be captured of the object to be captured on the holding surface.

<Mode E>

In any one the above modes A to D, the imaging device includes an imager such as the camera unit 14 provided with a wide-angle lens and captures the object to be captured on the holding surface using the imager. According to the present mode, even wheh an optical component at a forward end of the imager in an optical-axis direction is arranged near the holding surface, the capturing area of the imager can cover the entire plane to be captured of the object to be captured on the holding surface.

<Mode F>

In any of one of the above Modes A to E, the imaging device comprises an imager such as the camera unit 14 whose capturing area covers both the object to be captured on the holding surface and a position of a face of a user in front of the video-conference table. According to the present mode, various kinds of service can be provided. For example, a user may be authenticated or video conference with a remote site may be implemented using an imager that is used to capture the image of the plane to be captured of an object to be captured.

<Mode G>

The video-conference table according to any of one of the Modes A to F further comprises a holding-surface member, which makes up the holding surface, used for, for example, the image forming unit 20 and the panel unit the image forming unit 20 and the panel unit 10, and the imaging device is supported by a supporting member such as the panel unit 10 and the image forming unit 20 provided for the holding-surface member. According to the present mode, the relative positions of the imaging device and the holding surface can easily be determined, and the installation of the video-conference table according to the present mode becomes easier.

<Mode H>

In the above mode E, the supporting member is detachable from the holding-surface member. According to the present mode, it becomes easier to implement various kinds of usage patterns.

<Mode I>

In the above mode G or H, the holding surface is approximately parallel to a horizontal plane, and the supporting member extends in an approximately vertical direction from the holding-surface member, and supports the imaging device near an end of the supporting member. According to the present mode, an upward document placed on the holding surface can be captured as in the embodiments of the present disclosure as described above.

<Mode J>

The video-conference table according the above Mode I further includes an image reading unit such as the downward document scanner 30 configured to read an image of a to-be-scanned surface of an object to be scanned such as the downward document G2 placed on a contact glass facing the to-be-scanned surface of the object to be scanned, and the holding-surface member includes a contact glass supporting member such as the scanner housing 36 that supports the contact glass and an open/close member such as the document holding cover 35 openable and closable in relation to the contact glass. Moreover, the holding surface is formed on a top surface of the open/close member (i.e., the upward-document mounting table 35A), and the supporting member is attached to the contact glass supporting member. According to the present mode, even when the open/close member is opened, the supporting member does not move in synchronization with the open/close member, and thus the footprint of the video-conference table according to the present mode can be widened.

<Mode K>

In the above mode I or J, the holding surface is approximately parallel to a vertical plane, and the supporting member extends in an approximately horizontal direction from the holding-surface member and supports the imaging device near an end of the supporting member. According to the present mode, as in the modifications as described above, a forward-turned document held on the holding surface can be captured.

<Mode L>

In the above mode K, the supporting member has a top surface that is approximately parallel to a horizontal plane, and serves as a mounting table on which the object to be captured is mountable. According to the present mode, the top surface of the supporting member can be utilized. For example, an object to be captured may be placed on the top surface of the supporting member during the operation.

<Mode M>

The video-conference table according to any one the above modes G to L further includes the display 12 disposed on the supporting member to display an image obtained by capturing of the imaging device on a screen. According to the present mode, the display can be supported by a supporting member that supports the imaging device, and the apparatus can be prevented from enlarging even with the provision of the display.

<Mode N>

The video-conference table according the above Mode M further includes an operative position sensor such as the touch panel 13 configured to detect an operative position of a user on the screen. According to the present mode, it is not necessary to provide a control panel or the like at a different place, or a control panel or the like that is arranged at such a different place other then the screen can be downsized.

<Mode O>

In the above mode N, the display displays on the screen a superimposed image where an additional image is superimposed on the image, based on a result of detection performed by the operative position sensor when an image obtained by capturing of the imaging device is displayed on the screen. According to the present mode, a superimposed image where an additional image is superimposed on the image that was originally displayed on the screen of the display can be previewed and checked on the screen.

<Mode P>

The video-conference table according to any one of the above modes A to O further includes an image forming unit configured to form an image obtained by the imaging device on a recording material. According to the present mode, an image forming apparatus can be provided where the facing space of the holding surface can be utilized without the disturbance of the imaging device.

<Mode Q>

In a video-conference system, the video-conference table according to any one of the above modes A to P is coupled to an attachment such as the cabinet 41 having a surface approximately flush with the holding surface in a horizontal direction. According to the present mode, a video-conference system can be provided where the facing space of the holding surface can be utilized without the disturbance of the imaging device.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. The hardware platform includes any desired kind of hardware resources including, for example, a CPU, a RAM, and a HDD. The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A video-conference table comprising:
   an imaging device disposed outside, facing space facing an object to be captured on a holding surface, the imaging device being configured to capture the object to be captured held on the holding surface, in a slanting direction with reference to a normal-line direction of the holding surface; and
   a holding-surface member making up the holding surface, the imaging device being supported by a supporting member provided for the holding-surface member,
   wherein the holding surface is approximately parallel to a vertical plane and the supporting member extends in an approximately horizontal direction from the holding-surface member, to support the imaging device near an end of the supporting member, and
   wherein the supporting member includes a top surface approximately parallel to a horizontal plane, the top surface being configured to serve as a mounting table on which the object to be captured is mountable.

2. The video-conference table according to claim 1, further comprising an image processing device configured to perform image processing including correcting image data obtained by capturing of the imaging device to image data obtained when the surface of the object to be captured is captured in a normal-line direction of the holding surface.

3. The video-conference table according to claim 1,
   wherein the imaging device includes an imager configured to capture a front side of the object to be captured whose rear side is held on the holding surface,
   wherein the imaging device includes an optical component at a forward end of the imager in an optical-axis direction disposed near a boundary of the facing space that faces the front side of the object to be captured on the holding surface.

4. The video-conference table according to claim 1,
   wherein the imaging device includes an imager configured to capture a front side of the object to be captured whose rear side is held on the holding surface, wherein an optical-axis direction of the imager is inclined with reference to a normal-line direction of the holding surface.

5. The video-conference table according to claim 1, wherein
the imaging device comprises an imager provided with a wide-angle lens and captures the object to be captured on the holding surface using the imager.

6. The video-conference table according to claim 1, wherein the imaging device comprises an imager whose capturing area covers both the object to be captured on the holding surface and a position of a face of a user in front of the video-conference table.

7. The video-conference table according to claim 1, wherein the supporting member is detachable from the holding-surface member.

8. The video-conference table according to claim 1,
wherein the holding surface is approximately parallel to a horizontal plane,
wherein the supporting member extends in an approximately vertical direction from the holding-surface member, and supports the imaging device near an end of the supporting member.

9. The video-conference table according to claim 8, further comprising an image reading unit configured to read an image of a to-be-scanned surface of an object to be scanned placed on a contact glass facing the to-be-scanned surface of the object to be scanned,
wherein the holding-surface member includes a contact glass supporting member that supports the contact glass and an open-close member openable and closable in relation to the contact glass,
wherein the holding surface is disposed on a top surface of the open-close member,
wherein the supporting member is attached to the contact glass supporting member.

10. The video-conference table according to claim 1, further comprising a display disposed on the supporting member to display an image obtained by capturing of the imaging device on a screen.

11. The video-conference table according to claim 10, further comprising an operative position sensor configured to detect an operative position of a user on the screen.

12. The video-conference table according to claim 11, wherein the display displays on the screen a superimposed image where an additional image is superimposed on the image, based on a result of detection performed by the operative position sensor when an image obtained by capturing of the imaging device is displayed on the screen.

13. The video-conference table according to claim 1, further comprising an image forming unit configured to form an image obtained by the imaging device on a recording material.

14. A video-conference system comprising the video-conference table according to claim 1 being coupled to an attachment having a surface approximately flush with the holding surface in a horizontal direction.

* * * * *